US007418661B2

(12) United States Patent
Brandenberger

(10) Patent No.: US 7,418,661 B2
(45) Date of Patent: Aug. 26, 2008

(54) PUBLISHED WEB PAGE VERSION TRACKING

(75) Inventor: Sarah M. Brandenberger, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 10/246,503

(22) Filed: Sep. 17, 2002

(65) Prior Publication Data

US 2004/0054967 A1    Mar. 18, 2004

(51) Int. Cl.
    *G06N 3/00* (2006.01)
(52) U.S. Cl. ...................................... 715/255
(58) Field of Classification Search ............... 715/500, 715/513, 517, 501.1, 511, 523, 530, 234, 715/243, 254, 255
See application file for complete search history.

(56) References Cited

U.S. PATENT DOCUMENTS

| | | | | |
|---|---|---|---|---|
| 5,898,836 | A | 4/1999 | Freivald et al. | 709/218 |
| 5,978,842 | A | 11/1999 | Noble et al. | 709/218 |
| 5,983,268 | A | 11/1999 | Freivald et al. | 709/218 |
| 6,012,087 | A | 1/2000 | Freivald et al. | 709/218 |
| 6,029,175 | A | 2/2000 | Chow et al. | 707/104 |
| 6,119,124 | A | 9/2000 | Broder et al. | 707/103 |
| 6,219,818 | B1 | 4/2001 | Freivald et al. | 714/799 |
| 6,269,362 | B1 * | 7/2001 | Broder et al. | 707/4 |
| 6,278,992 | B1 * | 8/2001 | Curtis et al. | 707/3 |
| 6,324,555 | B1 * | 11/2001 | Sites | 715/517 |
| 6,366,933 | B1 * | 4/2002 | Ball et al. | 715/511 |
| 6,502,106 | B1 * | 12/2002 | Gampper et al. | 707/104.1 |
| 6,507,854 | B1 * | 1/2003 | Dunsmoir et al. | 715/501.1 |
| 6,547,829 | B1 * | 4/2003 | Meyerzon et al. | 715/501.1 |
| 6,584,466 | B1 * | 6/2003 | Serbinis et al. | 707/10 |
| 6,643,641 | B1 * | 11/2003 | Snyder | 707/4 |
| 2001/0016873 | A1 | 8/2001 | Ohkado et al. | |
| 2002/0013825 | A1 | 1/2002 | Freivald et al. | |
| 2002/0078087 | A1 * | 6/2002 | Stone | 707/511 |
| 2002/0178187 | A1 * | 11/2002 | Rasmussen et al. | 707/513 |
| 2003/0093585 | A1 * | 5/2003 | Allan | 709/330 |

OTHER PUBLICATIONS

Kahle, "Archiving the Internet," Nov. 4, 1996, <http://web.archive.org/web/19980113025831/www.archive.org/sciam_article.html>, pp. 1-8.*
"Brewset's millions," Jan. 27, 1997, <http://web.archive.org/web/19990117002422/www.irish-times.com/irish-times/paper/1997/0127/cmp1.html>, pp. 1-6.*
Screenshots 1-5, <http://archive.org>.*
"RFC 1321," Apr. 1992, <http://www.faqs.org/frcs/rfc1321.html>, pp. 1-19.*
"Portable Document Format (PDF) Reference Manual," Addison Wesley, 1993, pp. 5-13.

* cited by examiner

*Primary Examiner*—Stephen Hong
*Assistant Examiner*—Kyle R Stork

(57) ABSTRACT

Methods, computer program software, and apparatus for improved tracking of published versions of Web pages for generating a comprehensive record of when each version of a subject Web page was published on the Web.

32 Claims, 14 Drawing Sheets

Final Document "C"

| Page A1 |
| --- |
| Page B1 |
| Page A2X |
| Page B2X |
| Page A3 |
| Page B3 |
| Page A4 |
| Page B4 |
| Page AA |
| Blank page |
| Page A5 |
| Page B5 |
| Blank page |
| Page BB |
| Page A6 |
| Page B6 |
| Page A7 |
| Page B8 |
| Page A8 |
| Page B7 |

PUBLISHED WEB PAGE VERSION TRACKING

FIELD OF THE INVENTION

The present invention relates generally to the field of software configuration management. Described more particularly, the present invention provides methods, computer program software, and apparatus for improved tracking of published versions of Web pages.

BACKGROUND OF THE INVENTION

The Internet enables virtually instantaneous worldwide distribution (publication) of information at relatively low cost. As a result, a mind-boggling amount of information is posted and available on the Internet. In fact, the ease with which information can be published over the Internet and the concomitant ease with which such information can be updated, modified, or deleted create a novel set of disadvantages for those who use the Internet for information publication purposes. Namely, the fantastically dynamic nature of the Internet makes it very difficult for an Internet publisher whose publications undergo frequent and/or regular changes to know when and where each version of a given publication was published on the Internet.

The Internet is an international network of computers and computer networks connected to each other through routers using the IP protocol and sharing a common name and address space. One can communicate with any computer connected to the Internet simply by establishing a connection to an Internet router or node. The Internet is not a corporation or administrative arrangement; it is a method for connecting computer systems and the phenomenon of very widespread adherence to that method.

The Internet began in the 1960s with federally subsidized connections among universities and government research laboratories. It is the outgrowth of what began in 1969 as an experimental project of the United States Department of Defense's Advanced Research Project Agency ("ARPA") called "ARPANET," which was designed to enable computers operated by the military, defense contractors, and universities conducting defense-related research to communicate with one another by redundant channels even if some portions of the network were damaged by, for example, a war, a natural disaster, or a technical failure. The network later allowed researchers across the country to access directly and to use extremely powerful supercomputers located at a few key universities and laboratories. During the early days of the Internet, traffic unrelated to research and education was limited. But by approximately 1990, the Internet's potential as a model for an international information infrastructure had been recognized, and the federal government began to reduce the subsidy and to encourage private entities to take over responsibility for basic communication and traffic management functions. By 1995, the Internet had become a predominantly private and unsubsidized network. The Internet is now the quintessential open network.

From its inception, the network was designed to be a decentralized, self-maintaining series of redundant links between computers and computer networks, capable of rapidly transmitting communications without direct human involvement or control and with the automatic ability to reroute communications if one or more individual links were damaged or unavailable.

To achieve this resilient nationwide (and ultimately global) communications medium, the ARPANET encouraged the creation of multiple links to and from each computer (or computer network) on the network. Thus, a computer in Washington, D.C., might be linked (usually using dedicated telephone lines) to other computers in neighboring states or on the Eastern seaboard, which themselves would be linked to other computers.

A communication sent over this redundant series of linked computers could travel any of a number of routes to its destination. Thus, a message sent from a computer in Washington, D.C., to a computer in Palo Alto might first be sent to a computer in Philadelphia and then be forwarded to a computer in Pittsburgh and then to Chicago, Denver, and Salt Lake City, before finally reaching Palo Alto. If the message could not travel along that path (because of military attack, simple technical malfunction, or other reason), the message would automatically (without human intervention or even knowledge) be rerouted, perhaps, from Washington, D.C., to Richmond and then to Atlanta, New Orleans, Dallas, Albuquerque, Los Angeles, and finally to Palo Alto. This type of transmission and rerouting would likely occur in a matter of seconds.

The nature of the Internet is such that it is very difficult, if not impossible, to determine its size at a given moment. It is indisputable, however, that the Internet has experienced extraordinary growth in recent years. In 1981, fewer than 300 computers were linked to the Internet, and by 1989, the number stood at fewer than 90,000 computers. By 1993, over 1,000,000 computers were linked. At the end of the twentieth century, over 10,000,000 host computers worldwide, of which approximately sixty percent were located in the United States, were estimated to be linked to the Internet. This count does not include the personal computers people use to access the Internet. All told, reasonable estimates as of the beginning of the twenty-first century are that as many as 200,000,000 people around the world, and possibly more, can and do access the enormously flexible communication Internet medium.

The World Wide Web ("Web") is the best-known and most popular way of using the Internet. The Web comprises an epic assortment of displayed documents, which can contain text, images, sound, animation, moving video, and any other conceivable multimedia. Consistent with the decentralized essence of the Internet, documents on the Web are not collected in any central location; rather, they are stored on servers around the world running Web server software. To gain access to the content available on the Web, a user must have a Web browser—client software such as Netscape's NAVIGATOR® or Microsoft's INTERNET EXPLORER®, which are capable of displaying documents formatted in hypertext markup language ("HTML"), the standard Web formatting language. Each document has an address, known as a Uniform Resource Locator ("URL"), identifying, among other things, the server on which it resides. Most documents also contain "hyperlinks"—highlighted text or images that, when selected by the user, permit him or her to view another, related Web document. Because Web servers are linked to the Internet through a common communications protocol, known as hypertext transfer protocol ("HTTP"), a user can move seamlessly between documents, regardless of their physical location. When a user viewing a document located on one server selects a link to a document located elsewhere, the browser will automatically contact the second server and display the linked document.

Many laypeople erroneously believe that the Internet is coextensive with the Web. The Web really is a publishing forum that is a subset of the Internet; it is comprised of millions (inevitably soon to be billions) of separate Websites that display content provided by particular people or organizations. Thus, when reference is made herein to the Internet, such reference includes the Web, whereas reference to the Web does not include other parts of the Internet. The Web is thus comparable, from the readers' perspective, to both a vast library including millions of readily available and indexed publications and a sprawling mall offering goods and services. From the publishers' perspective, it constitutes a vast platform from which to address and hear from a global audience of millions of readers, viewers, researchers, and buyers. Any person or organization with a computer connected to the Internet can "publish" information. As used herein, the term "publish" means to make content available to the public at large by posting it on the Internet. Publishers include government agencies, educational institutions, commercial entities, advocacy groups, and individuals. Publishers may either make their material available to the entire pool of Internet users or confine access to a selected group, such as those willing to pay for the privilege.

Web standards are sophisticated and flexible enough that they have grown to meet the publishing needs of many large corporations, banks, brokerage houses, newspapers, and magazines, which now publish "online" editions of their materials, as well as government agencies, and even courts, which use the Web to disseminate information to the public. At the same time, Web publishing is simple enough that thousands of individual users and small community organizations are using the Web to publish their own personal "home pages," the equivalent of individualized newsletters, brochures, catalogs, etc., about the person or organization, which are available to everyone on the Web. Publication on the Web simply requires placing a formatted file on a host computer.

For commercial users, the Web is the most important part of the Internet. Unlike previous Internet-based communications formats, the Web is easy to use for people inexperienced with computers. Information on the Web can be presented on pages of text and graphics ("Web pages") that contain hyperlinks to other Web pages—either within the same set of data files ("Website") or within data files located on other computer networks. Users access information on the Web using browsers, which process information from Websites and display the information using graphics, text, sound, and animation. Because of these capabilities, the Web has become a popular medium for advertising and for direct consumer access to goods and services.

Commerce is one area in which the Internet is changing all the rules. The commercial use of the Internet tests the limits of traditional, territorial-based commercial law. The Internet knows no boundaries. To paraphrase Gertrude Stein, as far as the Internet is concerned, not only is there perhaps "no there there," the "there" is everywhere there is Internet access—essentially anywhere on the globe. When business is transacted over a computer network via a Website accessed by a computer in, for instance, Massachusetts, it takes place as much in Massachusetts, literally or figuratively, as it does anywhere else.

This revolutionary change is highly significant. Physical boundaries typically have framed legal boundaries, in effect creating signposts that warn that we will be required after crossing to abide by different rules. But the strength of the Internet is chaos (the essential absence of central control), which defies most conventional notions of boundaries. To impose traditional territorial concepts on the commercial use of the Internet has dramatic implications, opening the Web user up to inconsistent regulations throughout fifty states, indeed, throughout the globe. It also raises the possibility of dramatically chilling what may well be the most participatory marketplace of mass speech that this country—and indeed the world—has yet seen.

As noted above, the ease with which information can be published over the Internet and the concomitant ease with which such information can be updated, modified, or deleted create a novel set of disadvantages for those who use the Internet for information publication purposes. For example, information concerning what was published, when it was published, and where it was made available can be important to, and sometimes determinative of, issues such as, for instance, pricing and other disputes involving advertisements published over the Web and personal jurisdiction over the Web publishing entity, to name just a few. In such cases, it is critical for the Web publisher to maintain regular and accurate records of the publications it publishes on the Web.

As used herein, the term "Software Configuration Management" ("SCM") means the process of identifying, defining, recording and reporting the configuration of items in a system and the change requests. SCM also means controlling the releases and changes of the items throughout the life cycle of a Web page. The term SCM is used herein synonymously with the term "Web page change tracking" and variations thereof.

One commonly used, commercially available Web page change tracking tool is the CLEARCASE® family of software sold by Rational Software Corporation of Cupertino, California. CLEARCASE® and similar tools track editing of Web pages so the developer of the Web page knows what changes have been made relative to previous versions of the Web page, but, as far as the present inventor is aware, CLEARCASE® does not provide detailed information about when a particular version of the Web page was published over the Web. As such, CLEARCASE® is not useful for generating the regular, accurate records of Web page content that comprise one of the principal advantages of the present invention.

Another approach to Web page change tracking is described in U.S. Pat. No. 6,029,175, issued Feb. 22, 2000, to Chow et al. Chow describes an intelligent network agent, referred to as a Revision Manager, which provides notification to Web users of changes to designated Web pages. The Revision Manager of Chow is interposed between standard HTTP browsers and HTTP servers. Chow's Revision Manager monitors designated Web pages and, when changes are detected, save the modified document to a central cache that is accessible to many users of the Revision Manager. Chow's Revision Manager is principally directed to notifying Web users of modifications to Web pages of interest, but Chow does not teach record keeping of the times and dates during which each version of a Web page was published over the Web.

Yet another set of approaches to Matthew Freivald and others working in association with NetMind Technologies, Inc., of San Jose, Calif., have developed Web page change tracking. Freivald et al. have obtained a series of U.S. patents relating to these change tracking technologies, which are discussed generally and specifically below.

In general, Freivald tracks Web page changes through periodic polling of the Web pages to be tracked. Freivald's tracking of web pages is directed to use by a Web page user/reader. A Web page user registers the URL of a Web page of interest and provides an e-mail address for notification of changes. The Web page user can also specify sections of the subject Web page and other parameters with respect to which he or she wants notification of changes. The Web page at each registered URL is periodically retrieved and a signature for that version of the page is generated. The signature is stored in a history table so that each time the Web page is retrieved and the signature is generated, the signature can be compared against the other signatures stored in the history table in order to determine whether changes have occurred and whether such changes meet the user's parameters for notification. The advantages of Freivald's tracking are two fold: (1) little storage space is required because only the signatures of the Web pages are stored rather than the entire Web pages; and (2) the user only receives notification of changes that meet his or her specified parameters, so he or she is not overwhelmed with notifications of relatively unimportant changes.

U.S. Pat. No. 5,898,836, issued Apr. 27, 1999, to Freivald et al., describes Freivald's basic invention in which the signatures of the Web pages are generated by a change-detection server using a "Cyclic-Redundancy-Check" ("CRC") checksum procedure.

U.S. Pat. No. 5,978,842, issued Nov. 2, 1999, to Noble and Freivald, describes Freivald's invention wherein the detection of changes is performed by a client-side change-detection application downloaded and installed on the computers of users. As more users are registered for a Web page, change detection is performed more frequently.

U.S. Pat. No. 5,983,268, issued Nov. 9, 1999, to Freivald et al., describes the user-interface of the change-detection tool comprising a spreadsheet displayed to the user in which the user can specify his or her notification parameters by entering parameters, formulae, etc., in the spreadsheet and the user's formulae are applied to fields retrieved from the subject Web page and automatically entered in the spreadsheet, whereby the determination is made as to whether or not to notify the user of a change.

U.S. Pat. No. 6,012,087, issued Jan. 4, 2000, to Freivald et al., describes a change-detection tool which monitors the frequency of e-mail notifications sent to a user and, if the user is receiving too many e-mail notifications, the invention uses criteria based on HTML header information, rather than a checksum signature, to determine whether or not to send the user a change notification e-mail.

U.S. Pat. No. 6,219,818, issued Apr. 17, 2001, to Freivald et al., describes a change-detection web server in which Web pages are divided into HTML-bounded sections, and the user is enabled to specify that he or she only wants to be notified of changes occurring in certain HTML-bounded sections.

Freivald's Published U.S. patent application Ser. No. 20,020,013,825, published Jan. 31, 2002, describes a change-detection tool in which the user is only notified when new, unique content appears on the subject Web page. Detected changes are compiled into a periodic report that is sent to the user. In addition, user profile information is collected.

Freivald's inventions do not, however, provide a Web publisher a regular, accurate record of when each version of a Web page has been published. Instead, Freivald's inventions are primarily directed to notifying Web users of changes to Web pages in which such users have an expressed interest. Indeed, one of the main advantages of Freivald's change-detection tool is that the amount of storage space required is minimized by purposely not recording each version of the subject Web page. Therefore, Freivald's inventions are not useful to a Web publisher for whom it is critical to have a true and correct copy of each version of its Web page, including information concerning the times and dates during which each version of the Web page was published on the Web.

It is to be understood that numerous means of monitoring Web pages for changes are known now and many more undoubtedly will be developed in the future. The Chow and Freivald patents discussed above describe change detection for web pages. Additional Web page change detection methods and apparatus are described in U.S. Pat. No. 6,119,124, issued Sep. 12, 2000, to Broder et al., U.S. Pat. No. 6,324,555, issued Nov. 27, 2001, to Sites, and Ohkado et al.'s Published U.S. patent application Ser. No. 20,010,016,873, published Aug. 23, 2001.

It is apparent from the foregoing that a need exists for improved published Web page version tracking. Specifically, a need exists in the art for improved ways to track the content of Web pages to provide accurate information concerning the time period of publication of each version of a Web page.

BRIEF SUMMARY OF THE INVENTION

The present invention provides methods, computer program software, and apparatus for generating a comprehensive record of when each version of a subject Web page was published on the Web. As noted above, such records can be of great importance to Web publishers when disputes relating to published content arise. For example, in disputes involving pricing of an item listed for sale on a Web publication, the records generated by the present invention can provide historical proof of what price was published and when it was published. In this way, such disputes can be resolved quickly and conclusively without the necessity for reconstruction of the chronology of the various versions of the subject Web page.

Referring to drawing FIG. 1, the steps of the method according to the present invention are described in relation to provision of a published Web page version tracking service by a third party provider (i.e., one other than the Web publisher or the Web user). One method of the present invention starts at step S1-2 and proceeds immediately to step S1-4 where the Web publisher submits to the third party provider a copy of the original version of the subject Web page. Alternatively, such as in the case where the subject Web page is already "online" and the Web publisher desires only to track version changes from the date of submission to the third party provider forward, the Web publisher may submit the current version of the Web page to the third party provider. The third party provider stores a snapshot of the subject Web page, as initially provided to it by the Web publisher, for comparison with subsequent versions of the Web page. As used herein, the term "snapshot" means a complete copy of a Web page in the form it took at a particular point in time.

In one embodiment of the present invention, the Web publisher submits its original or current Web page and all subsequent versions thereof to the third party provider before or at the same time the Web page and all subsequent versions thereof are published on the Web. In this embodiment, the Web publisher is responsible for submitting all versions of the Web page to the third party provider in order to ensure that all versions of the Web page are checked for changes. In some embodiments of the present invention, the third party provider administers all posting of information to the subject Web page as a "gatekeeper" of Web page versions/content. This embodiment of the present invention is referred to as a gatekeeping capacity embodiment.

In other embodiments of the present invention, after receiving the original or current snapshot of the Web page, the third party provider polls the subject Web page at regular, frequent intervals in order to determine the Web page's version at any particular time and date. In such embodiments of the present invention, the third party provider polls the subject Web page at least daily so that at least a day-to-day record of changes can be maintained. This embodiment is referred to as a polling capacity embodiment.

The method then proceeds to step S1-6, at which the third party provider monitors the subject Web page for changes. As noted above, this monitoring can be conducted by the third party provider in either a gatekeeper capacity or a polling capacity.

When a change is detected at step S1-6, the method proceeds to step S1-10 where the third party provider records a snapshot of the changed Web page, including the time and date the change was detected. If the third party provider is serving in a gatekeeper capacity, the time and date of detection of the change will be the same as the time and date of publication of the changed Web page. If the third party provider is serving in a polling capacity, the time and date of change detection will be later than the time and date of publication of the changed Web page, depending on the frequency of polling. In circumstances where highly accurate publication time and date information is required, the third party provider most beneficially serves in the gatekeeper capacity.

The method of the present invention proceeds from step S1-10 to step S1-12 where a determination is made as to whether the subject Web page is still online. If the subject Web page is not still online, i.e., it is no longer published, the method proceeds immediately to step S1-14 where it ends and tracking operations cease.

If a determination is made at step S1-12 that the subject Web page is still online, i.e., it is still being published, the method returns to step S1-6 where the subject Web page is monitored for changes.

If at step S1-6 it is determined that no changes to the subject Web page are detected, the method proceeds to step S1-8 where monitoring continues and then to step S1-12 where a determination is made as to whether the subject Web page is still online. The method proceeds from step S1-12 as described above.

Referring now to drawing FIG. 2, the method according to the present invention is described in relation to provision of a Web page version tracking service by a computer program software ("software"). The software of the present invention may reside on the Web publisher's own information infrastructure (e.g., its own Web servers) or elsewhere, as determined by the Web publisher.

The method starts at step S2-2 and proceeds immediately to step S2-4 where the software records a snapshot of the original version of the subject Web page. Alternatively, such as in the case where the subject Web page is already "online" and the Web publisher desires only to track version changes from the date of implementation of software tracking forward, the software records a snapshot of the current version of the Web page.

In one embodiment of the present invention, the Web publisher submits each version of the Web page to the software for analysis before or at the time each version is posted on the Web page. In this embodiment of the present invention, the Web publisher is responsible for submitting all versions of the Web page to the software for analysis in order to ensure that all versions of the Web page are monitored for changes and a comprehensive record of the time period of publication of each version is generated. In other embodiments of the present invention, the software is integrated in the Web publisher's Web infrastructure in such a way that it is enabled to monitor all changes made to the subject Web page (gatekeeping capacity).

In other embodiments of the present invention, after recording the original or current snapshot of the Web page, the software polls the subject Web page at regular, frequent intervals in order to ascertain the Web page's version at any particular point in time (polling capacity). In such embodiments of the present invention, the software polls the subject Web page at least daily so that at least a day-to-day record of changes can be maintained.

The method then proceeds to step S2-6, at which the software monitors the subject Web page for changes. As noted above, this monitoring can be conducted by the software in either a gatekeeper capacity or a polling capacity.

When a change is detected at step S2-6, the method proceeds to step S2-10 where the software records a snapshot of the changed Web page, including the time and date the change was detected. If the software is configured in a gatekeeper capacity, the time and date of detection of the change will be the same as the time and date of publication of the changed Web page. If the software is configured in a polling capacity, the time and date of change detection will be later than the time and date of publication of the changed Web page, depending on the frequency of polling. In circumstances where highly accurate publication time and date information is required, the software is most beneficially configured in the gatekeeper capacity.

The method proceeds from step S2-10 to step S2-12 where a determination is made as to whether the subject Web page is still online. If the subject Web page is not still online, i.e., it is no longer published, the method proceeds immediately to step S2-14 where it ends and tracking operations cease.

If a determination is made at step S2-12 that the subject Web page is still online, i.e., it is still being published, the method returns to step S2-6 where the subject Web page is monitored for changes.

If at step S2-6 it is determined that no changes to the subject Web page are detected, the method proceeds to step S2-8 where monitoring continues and then to step S2-12 where a determination is made as to whether the subject Web page is still online. The method proceeds from step S1-12 as described above.

In another embodiment of the present invention, a snapshot of the subject Web page is recorded automatically on a regular basis, such as, for example, a daily basis. In this embodiment, the Web publisher is enabled to maintain an accurate record of what was published on the subject Web page each day, whether or not changes occurred. Although more demanding in terms of storage required, this embodiment nevertheless serves the purpose of providing the Web publisher with a day-to-day record of what was published on the subject Web page.

BRIEF DESCRIPTION OF THE SEVERAL FIGURES OF THE DRAWINGS

The present invention can be more readily ascertained from the following detailed description of the invention when read in conjunction with the accompanying drawings in which.

DETAILED DESCRIPTION OF THE INVENTION

Figure 1:
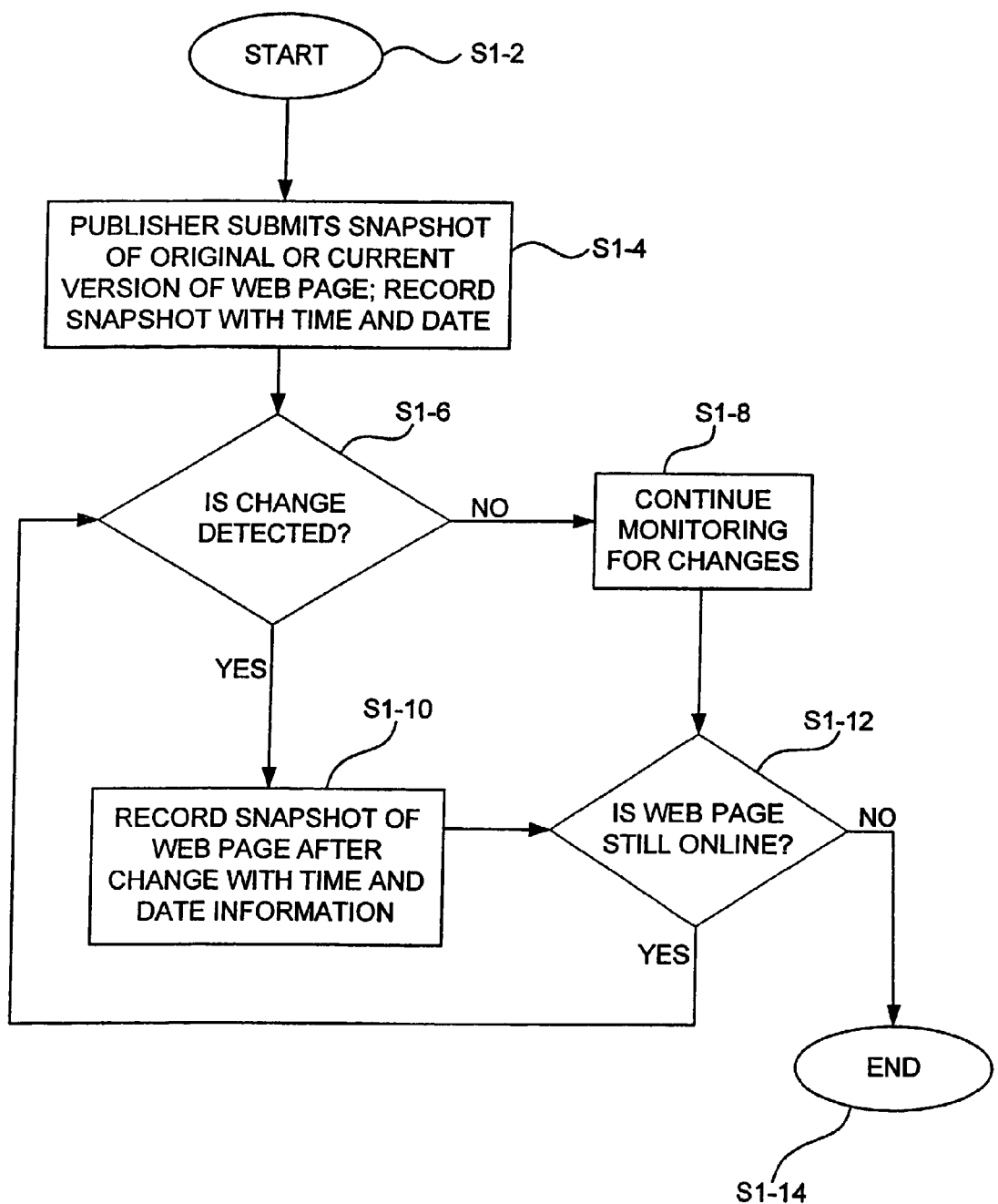
FIG. 1 is a block diagram of the method according to the present invention in which a Web page version tracking service is provided by a third party.

Referring to drawing FIG. 1, the method according to the present invention is described in relation to provision of a published Web page version tracking service by a third party provider (i.e., one other than the Web publisher or the Web user). The method starts at step S1-2 and proceeds immediately to step S1-4 where the Web publisher submits to the third party provider a copy of the original version of the subject Web page. Alternatively, such as in the case where the subject Web page is already "online" and the Web publisher desires only to track version changes from the date of submission to the third party provider forward, the Web publisher may submit the current version of the Web page to the third party provider. The third party provider stores a snapshot of the subject Web page, as initially provided to it by the Web publisher, for comparison with subsequent versions of the Web page. As used herein, the term "snapshot" means a complete copy of a Web page in the form it took at a particular point in time.

In one embodiment of the present invention, the Web publisher submits its original or current Web page and all subsequent versions thereof to the third party provider before or at the same time the Web page and all subsequent versions thereof are published on the Web. In this embodiment, the Web publisher is responsible for submitting all versions of the Web page to the third party provider in order to ensure that all versions of the Web page are checked for changes. In some embodiments of the present invention, the third party provider administers all posting of information to the subject Web page as a "gatekeeper" of Web page versions/content.

In other embodiments of the present invention, after receiving the original or current snapshot of the Web page, the third party provider polls the subject Web page at regular, frequent intervals in order to determine the Web page's version at any particular time and date. In such embodiments, the third party provider polls the subject Web page at least daily so that at least a day-to-day record of changes can be maintained. This embodiment of the present invention is referred to as a polling capacity embodiment.

The method then proceeds to step S1-6, at which the third party provider monitors the subject Web page for changes. As noted above, this monitoring can be conducted by the third party provider in either a gatekeeper capacity or a polling capacity.

When a change is detected at step S1-6, the method proceeds to step S1-10 where the third party provider records a snapshot of the changed Web page, including the time and date the change was detected. If the third party provider is serving in a gatekeeper capacity, the time and date of detection of the change will be the same as the time and date of publication of the changed Web page. If the third party provider is serving in a polling capacity, the time and date of change detection will be later than the time and date of publication of the changed Web page, depending on the frequency of polling. In circumstances where highly accurate publication time and date information is required, the third party provider most beneficially serves in the gatekeeper capacity.

The method proceeds from step S1-10 to step S1-12 where a determination is made as to whether the subject Web page is still online. If the subject Web page is not still online, i.e., it is no longer published, the method proceeds immediately to step S1-14 where it ends and tracking operations cease.

If a determination is made at step S1-12 that the subject Web page is still online, i.e., it is still being published, the method returns to step S1-6 where the subject Web page is monitored for changes.

If at step S1-6 it is determined that no changes to the subject Web page are detected, the method proceeds to step S1-8 where monitoring continues and then to step S1-12 where a determination is made as to whether the subject Web page is still online. The method proceeds from step S1-12 as described above.

Figure 2:
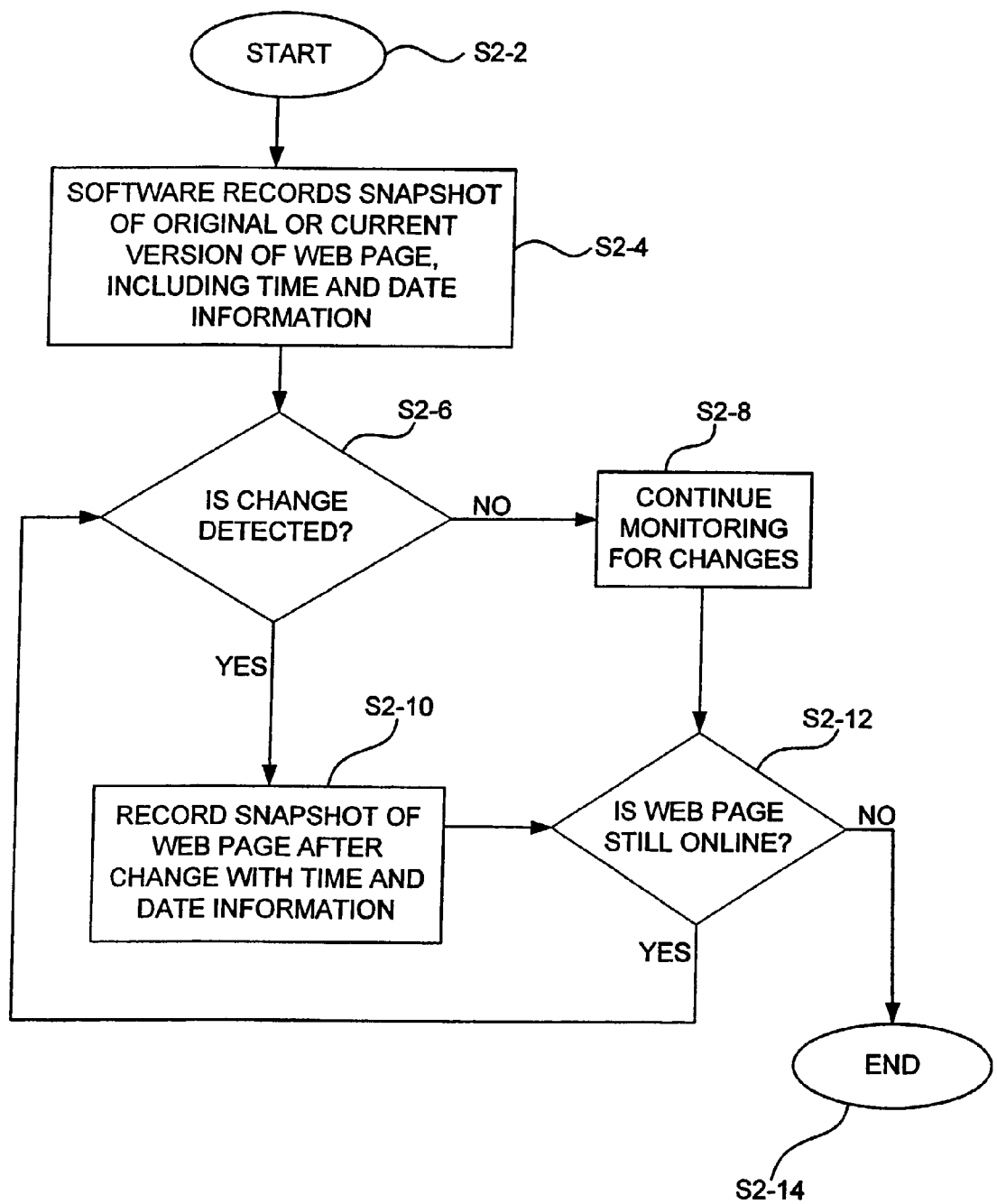
FIG. 2 is a block diagram of the method according to the present invention in which a Web page version tracking operation is conducted by a computer program product administered by the publisher of the Web page.

Referring now to drawing FIG. 2, the steps of the method according to the present invention are described in relation to provision of a Web page version tracking service by a computer program product ("software"). The software of the present invention may reside on the Web publisher's own Web servers or elsewhere, as determined by the Web publisher.

The method starts at step S2-2 and proceeds immediately to step S2-4 where the software records a snapshot of the original version of the subject Web page. Alternatively, such as in the case where the subject Web page is already "online" and the Web publisher desires only to track version changes from the date of implementation of software tracking forward, the software records a snapshot of the current version of the Web page.

In one embodiment of the present invention, the Web publisher submits each version of the Web page to the software for analysis before or at the time each version is posted on the Web page. In this embodiment of the present invention, the Web publisher is responsible for submitting all versions of the Web page to the software for analysis in order to ensure that all versions of the Web page are monitored for changes and a comprehensive record of the time period of publication of each version is generated. In other embodiments, the software is integrated in the Web publisher's Web infrastructure in such a way that it is enabled to monitor all changes made to the subject Web page (gatekeeping capacity).

In other embodiments of the present invention, after recording the original or current snapshot of the Web page, the software polls the subject Web page at regular, frequent intervals in order to ascertain the Web page's version at any particular point in time (polling capacity). In such embodiments of the present invention, the software polls the subject Web page at least daily so that at least a day-to-day record of changes can be maintained.

The method then proceeds to step S2-6, at which the software monitors the subject Web page for changes. As noted above, this monitoring can be conducted by the software in either a gatekeeper capacity or a polling capacity.

When a change is detected at step S2-6, the method proceeds to step S2-10 where the software records a snapshot of the changed Web page, including the time and date the change was detected. If the software is configured in a gatekeeper capacity, the time and date of detection of the change will be the same as the time and date of publication of the changed Web page. If the software is configured in a polling capacity, the time and date of change detection will be later than the time and date of publication of the changed Web page, depending on the frequency of polling. In circumstances where highly accurate publication time and date information is required, the software is most beneficially configured in the gatekeeper capacity.

The method proceeds from step S2-10 to step S2-12 where a determination is made as to whether the subject Web page is still online. If the subject Web page is not still online, i.e., it is no longer published, the method proceeds immediately to step S2-14 where it ends and tracking operations cease.

If a determination is made at step S2-12 that the subject Web page is still online, i.e., it is still being published, the method returns to step S2-6 where the subject Web page is monitored for changes.

If at step S2-6 it is determined that no changes to the subject Web page are detected, the method proceeds to step S2-8 where monitoring continues and then to step S2-12 where a determination is made as to whether the subject Web page is still online. The method proceeds from step S1-12 as described above.

As noted above, any change detection tool known in the art may be used in conjunction with the present invention. For purposes of illustration, the change detection tool described in U.S. Pat. No. 6,324,555, issued Nov. 27, 2001, to Sites, is set forth herein. The change detection tool of Sites, or any other change detection tool, may be used to perform the change detection functions of any of the embodiments of the present invention.

Referring now to FIGS. 3 through 8, the change detection tool (the "program") compares two documents (e.g., Web pages), "A" and "B", on a page-by-page basis based on the printable contents of documents "A" and "B". Whole pages are compared. The program can separate and compare different objects embedded in a page. The paired pages can be stored in a newly created "difference" document C. The organization of the pages in the difference document C will be discussed below.

The change detection tool will be described with reference to a set of pages from a pair of documents. Page 180 of document "A" (FIG. 4) contains a header 182, a text region 184, a graphic object 186, a footer 188 and annotations 190. Page 192 of document "B" (FIG. 5) contains a header 194 and annotation 196, which are different from header 182 and annotations 190 of document "A", and a text region 184, a graphic object 186, a footer 188 which are identical to those of document "A". Pages 180 and 192 thus differ only with respect to their respective headers 182, 194 and annotations 190, 196.

Figure 3:
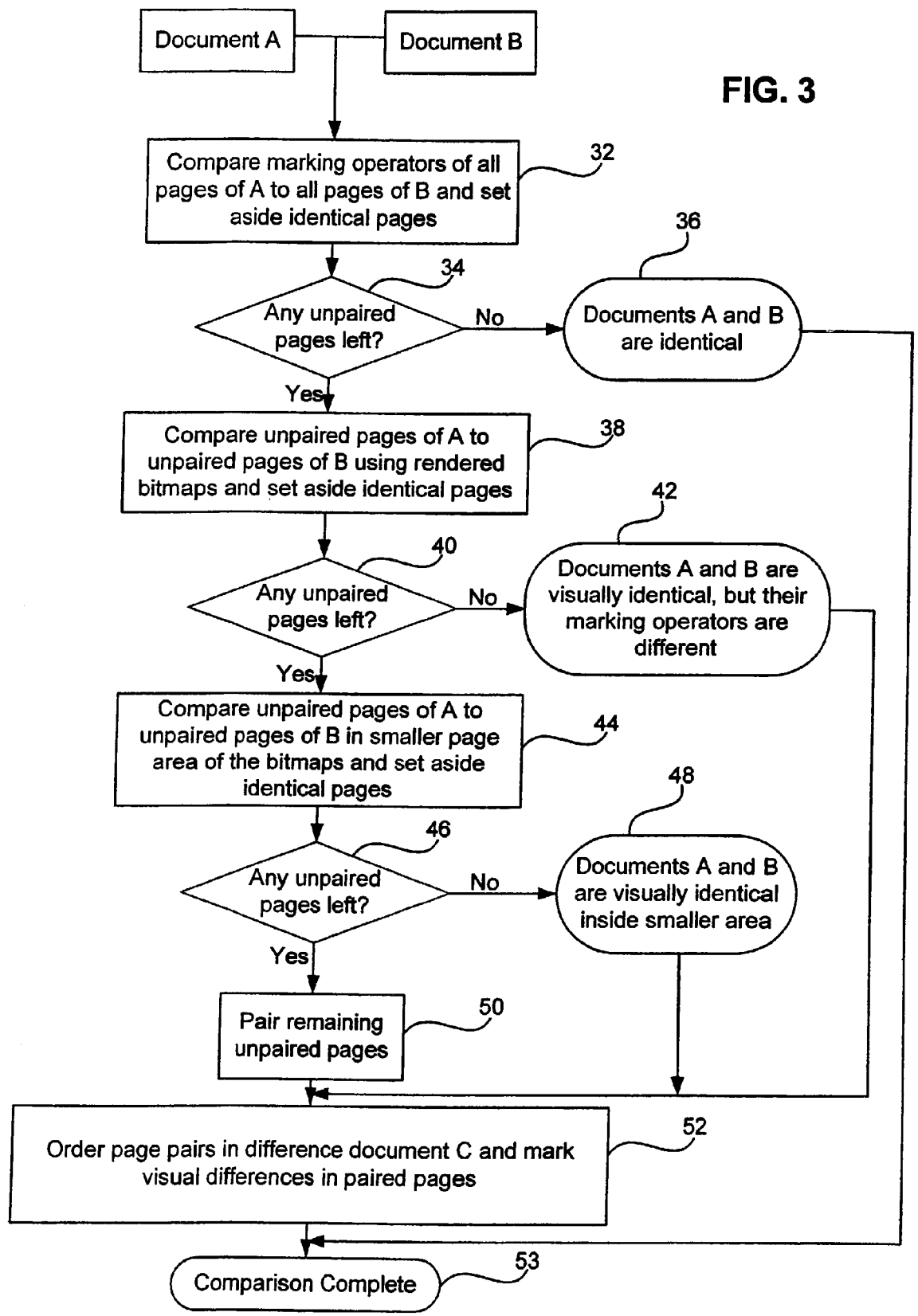
FIG. 3 is a flowchart of a process for page-by-page comparison of two documents.
Figure 5:
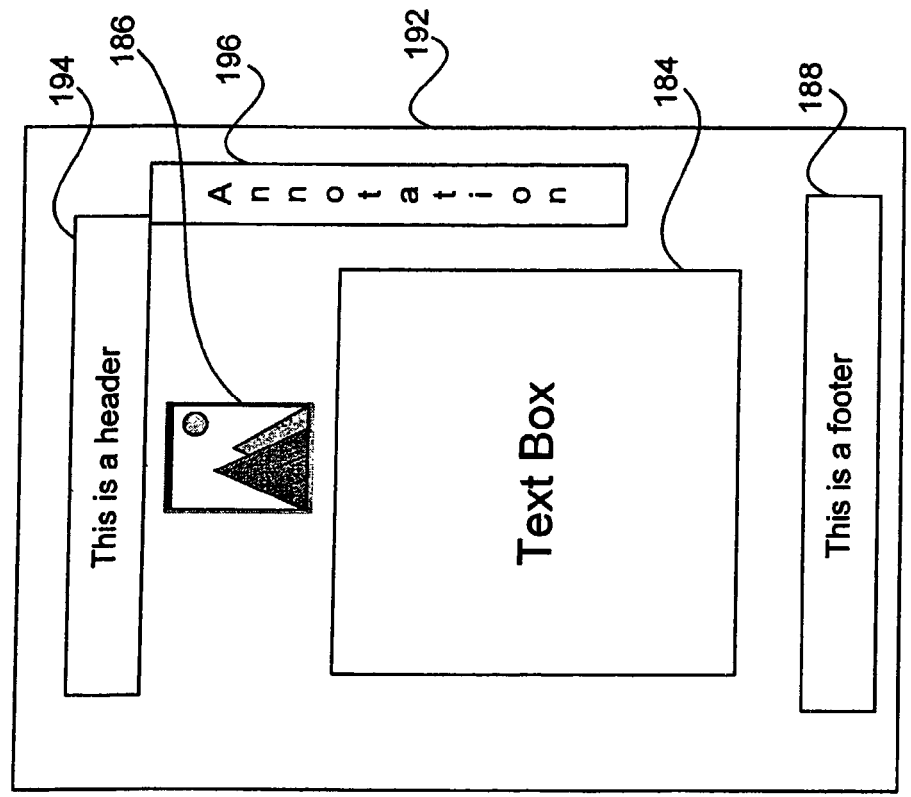
FIGS. 4 through 7 are schematic illustrations of paired pages with visible differences.
Figure 4:
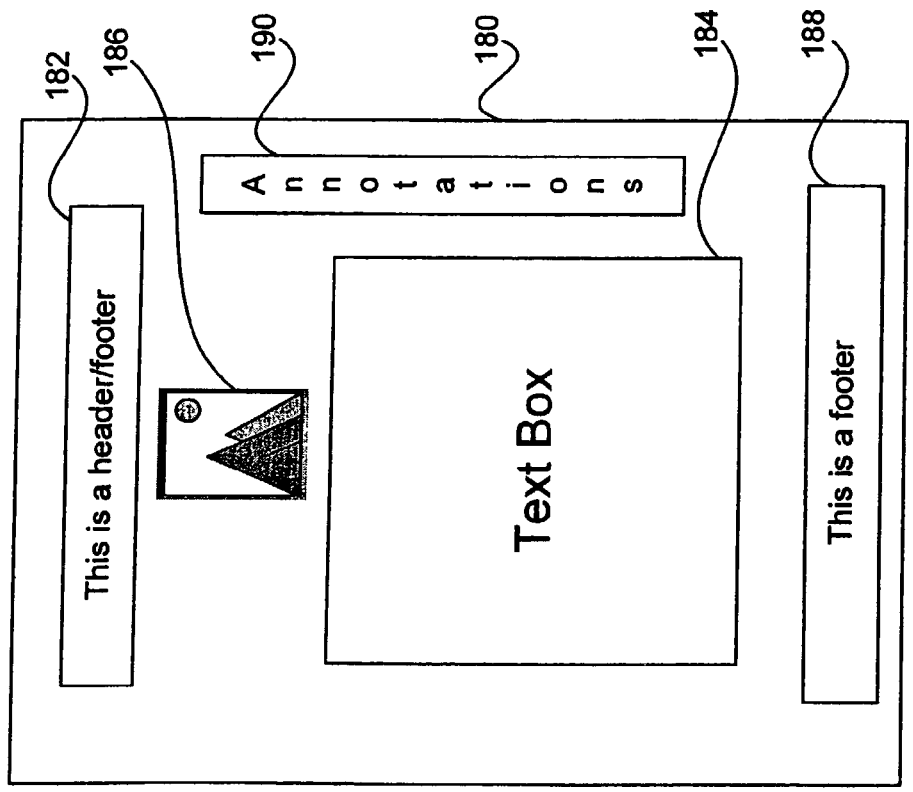

Referring to FIG. 3, the program compares all pages of document "A" to all pages of document "B". The comparison is based on a page digest computed for each page of each of the documents. The pages are first compared 32 based on page digests computed from marking operators of the pages. The program pairs and tags those pages, which are found to have identical page digests. If all pages of document "A" can be paired 34 with pages of document "B" based on identical digests and no unpaired pages remain, then the two documents are identical documents 36 and the process terminates 53.

Figures 6, 7:
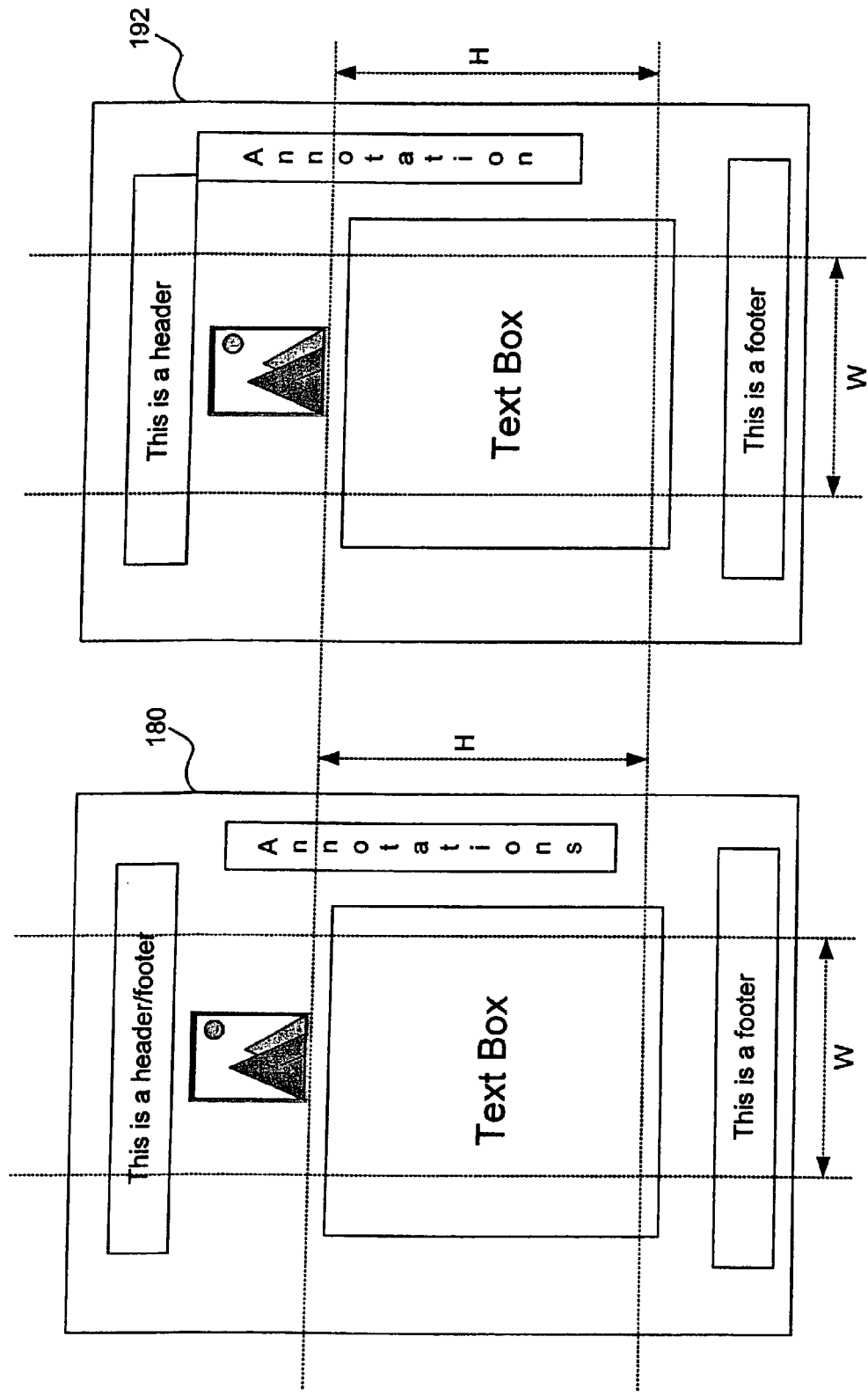

If unpaired pages remain, then the unpaired pages of document "A" are compared 38 to the unpaired pages of document "B" using a different criterion, such as comparing bitmaps rendered from the pages. If the pages are found to have identical bitmaps 40, then the two documents are visually identical (i.e., the differences are indiscernible when the documents are printed) and the process goes via 42 to 52 where the pages in difference document "C" are ordered and the visual differences are marked. The visually identical pages are tagged. The process subsequently compares 44 the still unpaired pages of document "A" to still unpaired pages of document "B" over a subset of the bitmap, e.g., in a smaller page area, with the same size and location on the pages of documents "A" and "B". The smaller area selected on respective pages 180, 192 has the width W and the height H, as indicated in FIGS. 6 and 7.

If the pages in 46 are found to be identical within the smaller area, then the respective pages of the two documents are paired and the process goes via 48 to 52 where the pages in difference document "C" are ordered and the visual differences are marked. If there are still unpaired pages remaining 46, then any still unpaired page, e.g., a page of document "A", is considered to have no match and is either paired 50 with another still unpaired page of document "B" (if both unpaired pages of documents "A" and "B" immediately follow a page pair) or a corresponding blank page is inserted into difference document "C". The visual differences are marked 52 on the paired pages and the process terminates 53.

Figure 9:
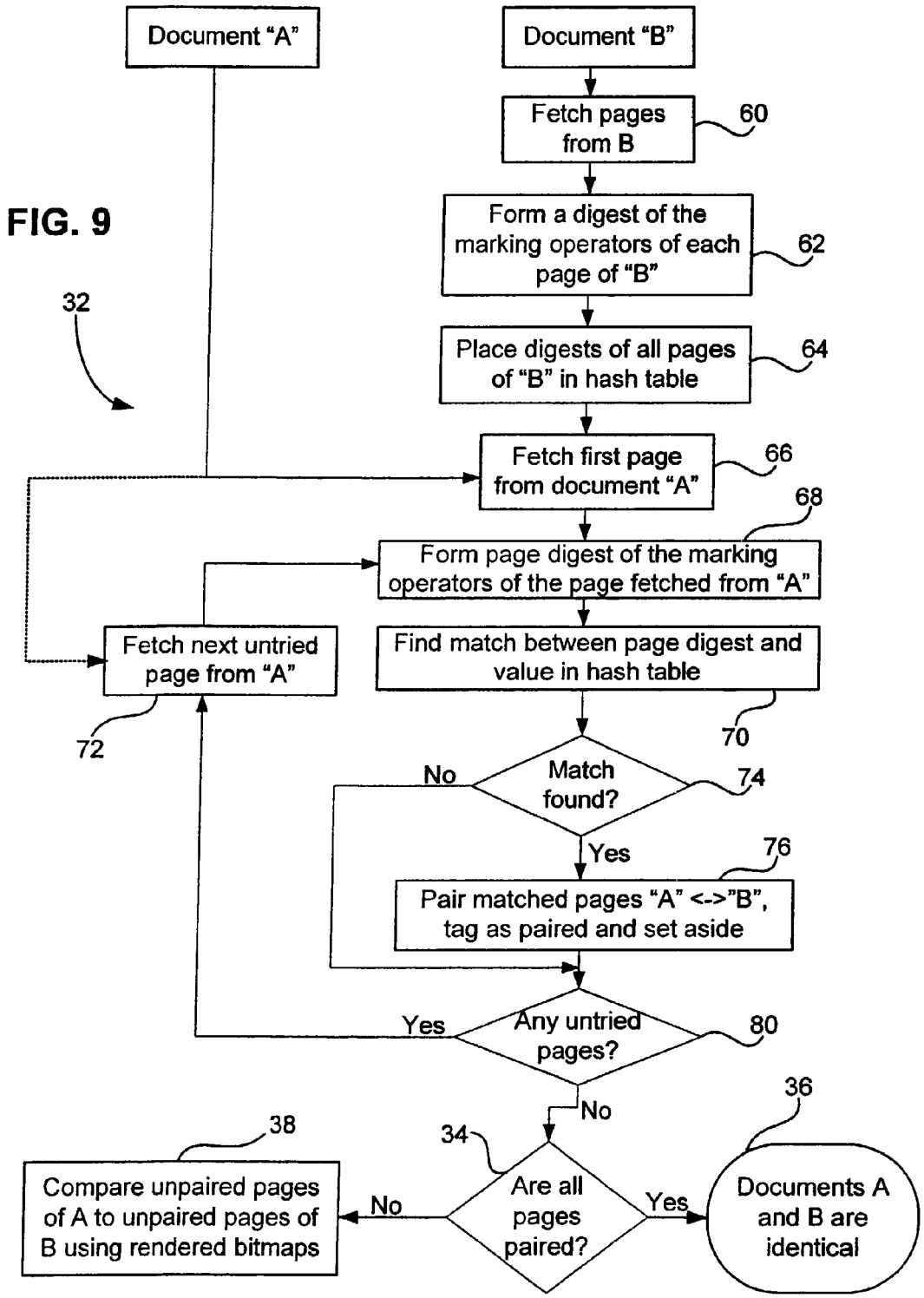
FIGS. 9 through 11 and 20 are flowcharts showing details of the comparison process according to the present invention, as depicted in FIG. 9.

Referring now to FIG. 9, the compare process 32 (FIG. 3) fetches in 60 pages from document "B" and a page digest is produced 62 for every page of document "B". The page digest is built up from digests of individual marking operators of the page. Marking operators are commands in page description language that describe a page. Such marking operators are described, for example, in the *Portable Document Format (PDF) Reference Manual*, Addison Wesley, 1993.

If the marking operator is a scalar (direct or indirect), its digest is a hash of the object type and object value, including all the bytes of an object value that is a string. If the object is an array, its digest is a hash of the array type and length and all the array elements. If the object is a dictionary, the digest is a hash of the dictionary type and its contents. If the object is a stream, its digest is a hash of the stream contents and the stream dictionary.

Dictionary contents are hashed by enumerating all the keys, sorting them, then incorporating the key-value pairs in sorted order. This makes the digest stable even if the order of the key enumeration varies between the two documents.

If a stream is filtered and/or encrypted, then reading the stream unfilters and decrypts. The Length, Filter, and FilterParams entries in the dictionary are ignored, so that the same stream contents can be compressed in different ways in the two files and still have equal digests.

Arrays, dictionaries, and streams often contain indirect references to other objects, and these references can form loops. A simple recursive walk will loop forever. Such a loop can be prevented by keeping a hash table of all indirect nonscalar objects encountered on a page, along with the exact order of encounter. If an object is encountered a second or subsequent time, a pair "duplicate object, order of encounter" is added to the digest and the recursion terminates. Thus, each object on a page is visited just once. Hash tables thus keep the processing time linear with respect to the size of the page. The hash table is cleared at the beginning of each page, so the page digest is not affected by the order in which pages are visited.

File object numbers and generations need not be included in the digest calculation, so that the digest of a page need not be affected by optimizing one of the files being compared. Optionally, they can be included.

The process ignores all page attributes that do not affect the appearance of the printed page, but such ignored attributes can be included if desired.

The digests can be computed, for example, using a modified 32-bit cyclic redundancy check (CRC32) calculation. New 32-bit values are XORed directly into a running 32-bit digest. The result is shifted to the left by 1 bit and the bit, which is shifted out to the left, is XORed back in according to the CRC32 polynomial. The resulting digest is very fast and sufficiently secure. Alternatively, a full 128-bit hash function, such as MD5, can be used. This would, however, be significantly slower.

Figures 14, 15:
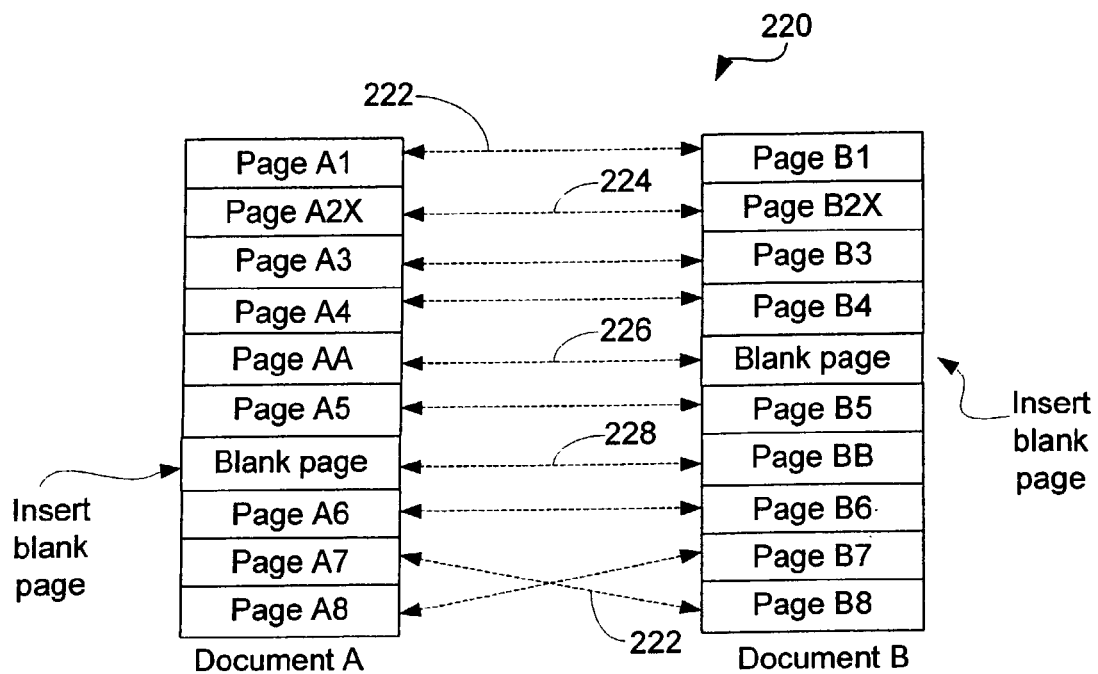

The page digest that is computed from the marking operators is placed 64 in a hash table. Subsequently, pages from document "A" are sequentially fetched 66 and a page digest of the marking operators for each sequentially fetched page of document "A" is formed 68 and looked up in the hash table 70. If the page digest value of document "A" matches a value of the hash table 74, then the page of document "A" is identical to the page of document "B" that has the corresponding digest value in the hash table. If multiple pages of one document have the same digest value (such as, for example, two completely blank pages in each document), then the first encountered page is matched first and subsequent pages are matched in order 76. Matching pages are paired, tagged and set aside in the difference document "C", as illustrated in FIG. 15.

The check process 80 checks if all pages have been tried for a match. If all pages have been tried 80, then the program checks 34 if all pages have been found to match. If not all pages of document "A" have been tried, a next page is fetched 72 from document "A" and the page digest of that page is formed 68.

If all pages are paired 36, then document "A" is identical to document "B" and the program is complete and terminates 53. Otherwise, the program branches to 38 to compare unpaired pages of document "A" to unpaired pages of document "B" using rendered bitmaps.

Figure 10:
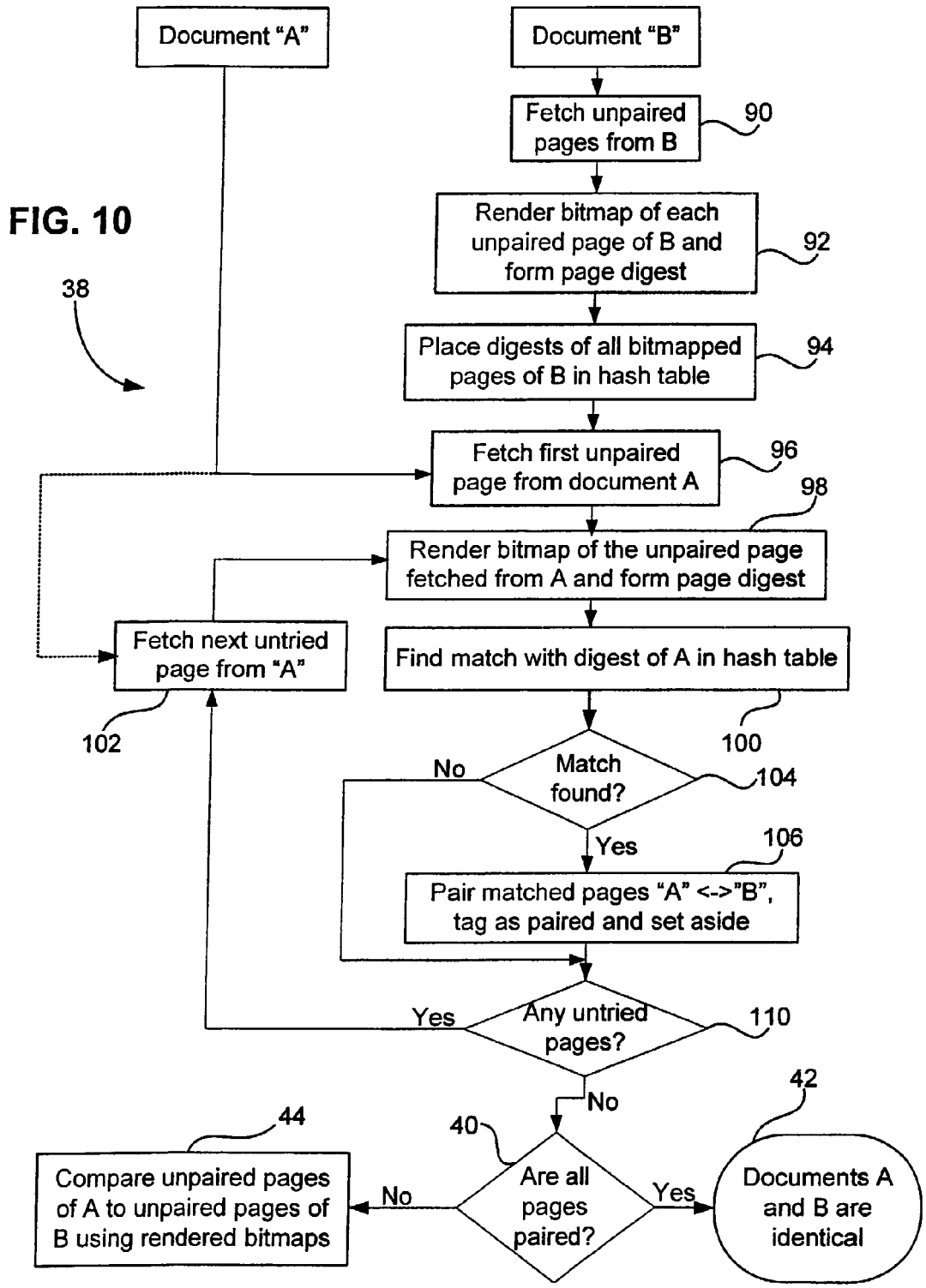

Referring now to FIG. 10, compare process 38 (FIG. 3) fetches 90 unpaired pages from document "B" and each unpaired page is rendered 92 as an off-screen bitmap at a predetermined resolution. The resolution of the bitmap page is selected to be sufficient to resolve differences that are noticeable on the printed page while providing acceptable computational performance. The bitmap used in the present example has a fairly low resolution of 36 DPI and 16-bit RGB color. With this resolution, subtle one-letter changes in 4-point Times-Roman text ("e" to "c" and "I" to "i") are reliably detected. Some one-letter changes are detected in 1.5-point type. Full-word changes are detected in 0.25-point type.

The bitmaps are used to compute 92 page digests using; for example, the same modified CRC32 calculation described above. The page digests are placed 94 in a hash table.

Then unpaired pages from document "A" are sequentially fetched 96. A bitmap is rendered 98 and the page digest of the bitmap page of document "A" is formed 98 and looked up 100 in the hash table. If the bitmap page digest value of document "A" matches 104 a bitmap value of the hash table 94, then the page of document "A" is visually identical to, i.e., has the same printable contents, the corresponding page of document "B" which has the same digest value. The two matching pages are paired, tagged and set aside 106 in difference document "C".

The process 38 checks 110 if all pages have been tried for a match. If all pages have been tried, then the process 38 checks 40 if all pages are paired. If not all pages of document "A" have been tried, then checking 110 goes to fetch 102 a new untried page from document "A", a bitmap is rendered 98, and the process repeats.

If all pages match 40 and are paired, then document "A" is visually identical to document "B" and the compare process 38 is complete and terminates 36. Pages that are visually identical, but have different marking operators, will be marked with a visually distinct border around the entire page, as will be discussed below. If not all pages are paired 40, then the process goes to 44 to compare unpaired pages of document "A" to unpaired pages of document "B" in a smaller, but identical page area of the respective bitmaps.

Figure 11:
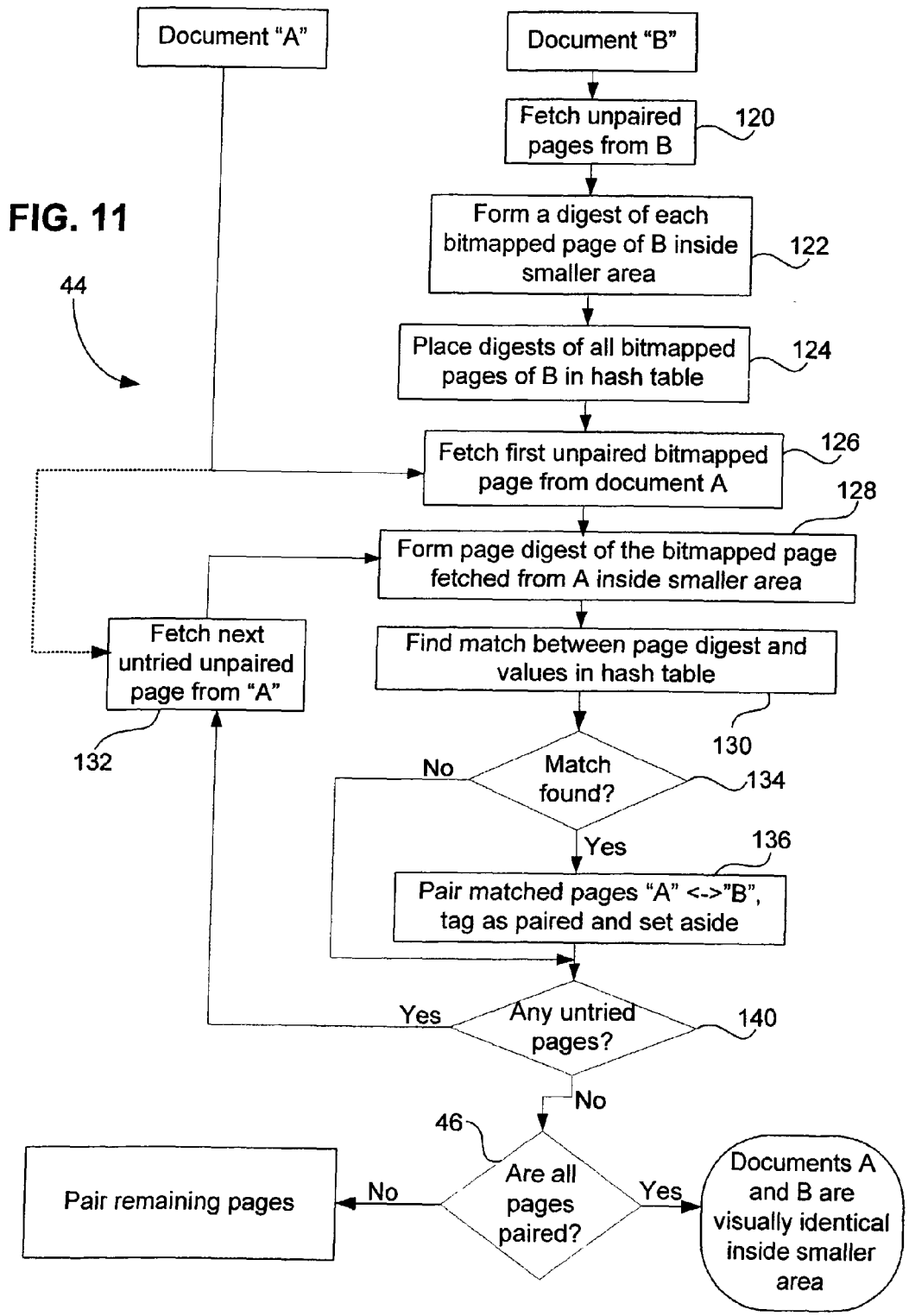

Referring now to FIG. 11, process 44, fetches 120 still unpaired pages from document "B". A smaller area on each page of document "B" is selected for comparison. As illustrated in FIGS. 6 and 7, this smaller area is advantageously, but not necessarily, located near the center of the page. This process often pairs up pages that are identical except for running page numbers or dates or, as in the present example, header/footer text and annotations, respectively.

A page digest of the bitmap, which corresponds to that smaller page area, is formed 122 for every page of document "B" and placed 124 in a hash table. Then unpaired pages from document "A" are sequentially fetched 126 and a page digest of the same smaller page area of the rendered bitmap of a page of document "A" is formed 128 and looked up 130 in the hash table. If the page digest value of document "A" matches 134 a value of the hash table, then the page of document "A" is visually identical to the corresponding page of document "B" with the same digest value, except for the page area which lies outside the smaller area which was used to compute the page digest. The two matching pages are paired, tagged and set aside 136 in difference document "C".

The process 44 checks 140 if all pages have been tried for a match. If all pages have been tried 140, the process 44 checks 46 if all pages are paired. If not all pages of document "A" have been tried 140, then the process 44 fetches 132 a new untried page from document "A" and the page digest of the corresponding smaller page area is again formed 128.

Figure 12:
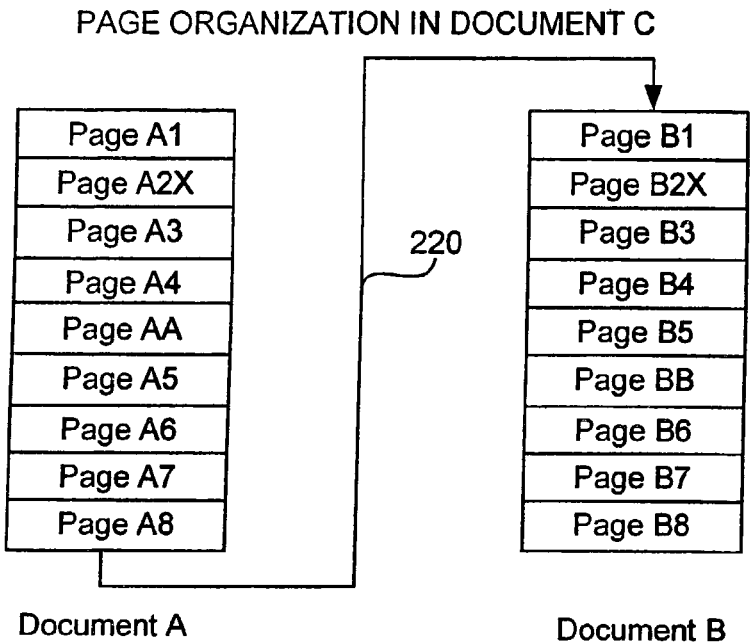
FIGS. 12 through 15 are block diagrams showing page organization of the documents.
Figure 13:
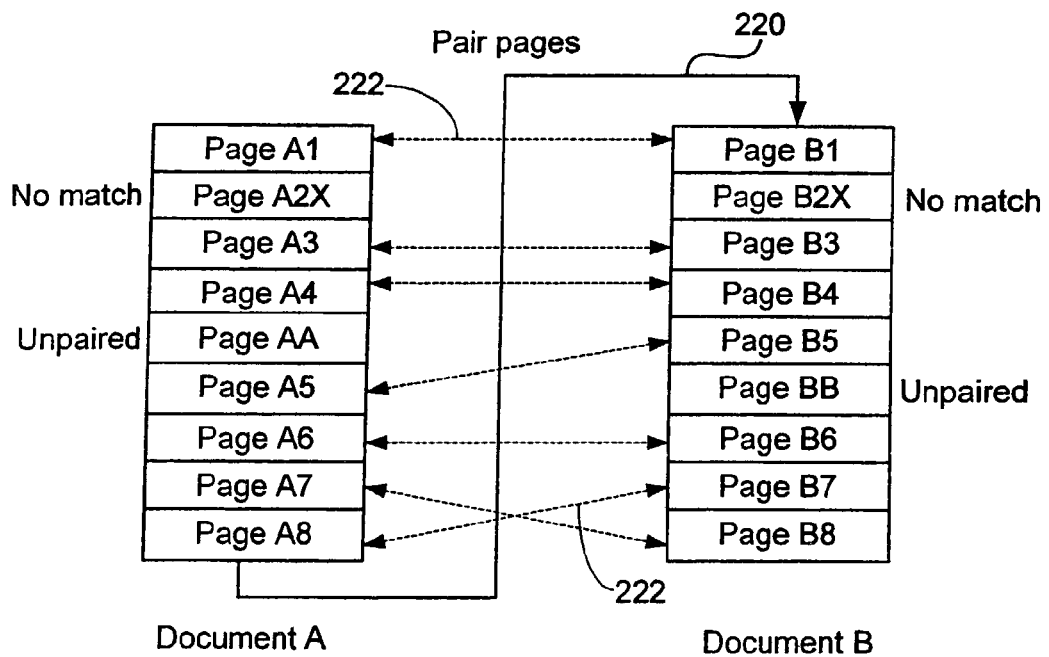

The page organization of the starting documents "A" and "B" and of the final difference document "C" is illustrated in FIGS. 12 through 15. The initial difference document "C" is created by arranging in a sequential order first all pages from document "A" and then all pages from document "B", as indicated in FIGS. 12 to 14 by the arrow 220. At this point in the process, some of the pages (A1, A3, A4, A5, A6, A7 and A8) of document "A" are each paired with a corresponding page (B1, B3, . . . , B6, B8, B7) of document "B", as indicated by the arrows 222. Pages of document "A" (pages A2X, AA) and of document "B" (pages B2X, BB) which have no match still remain.

Figure 8:
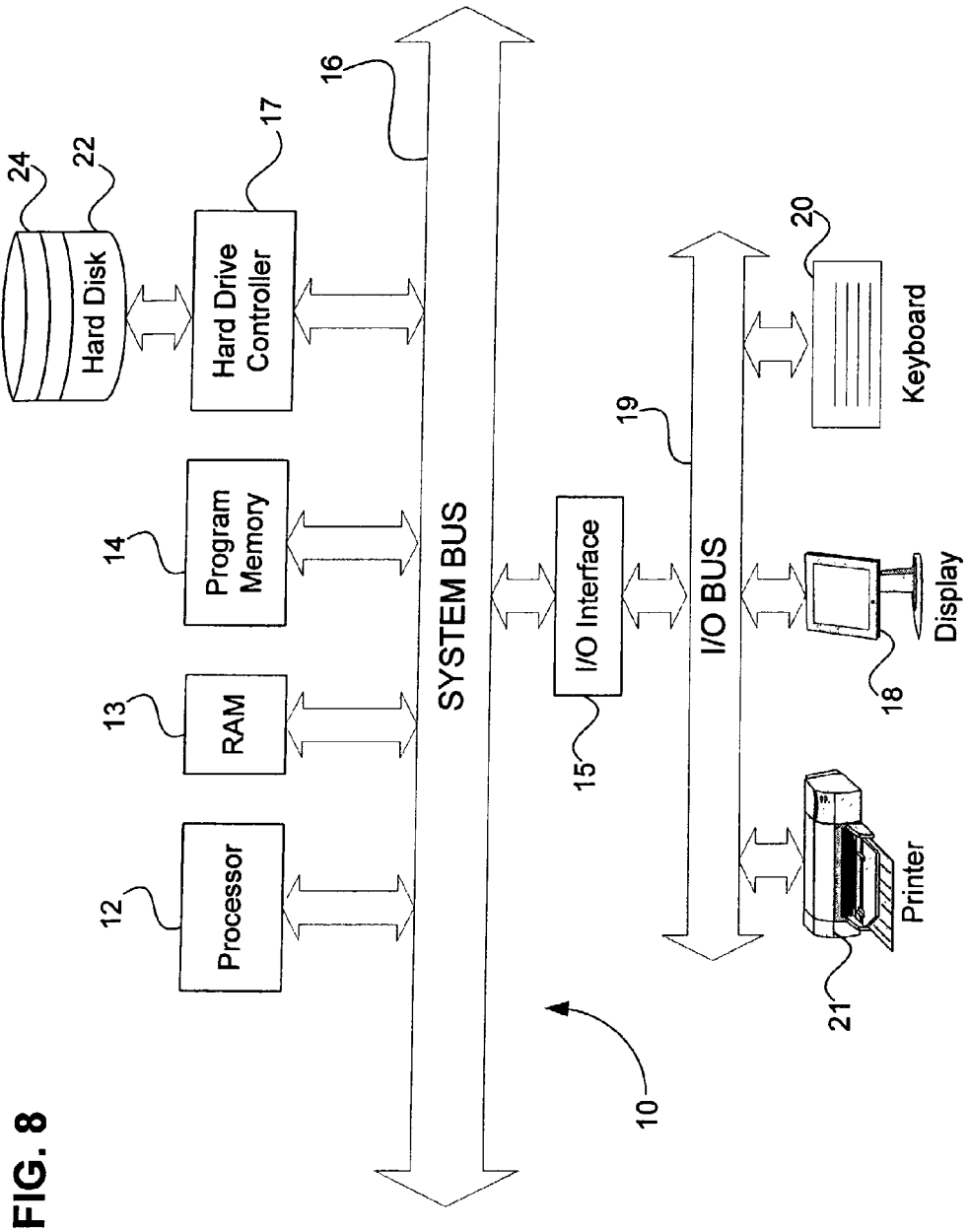
FIG. 8 is a block diagram of a computer system.
Figure 20:
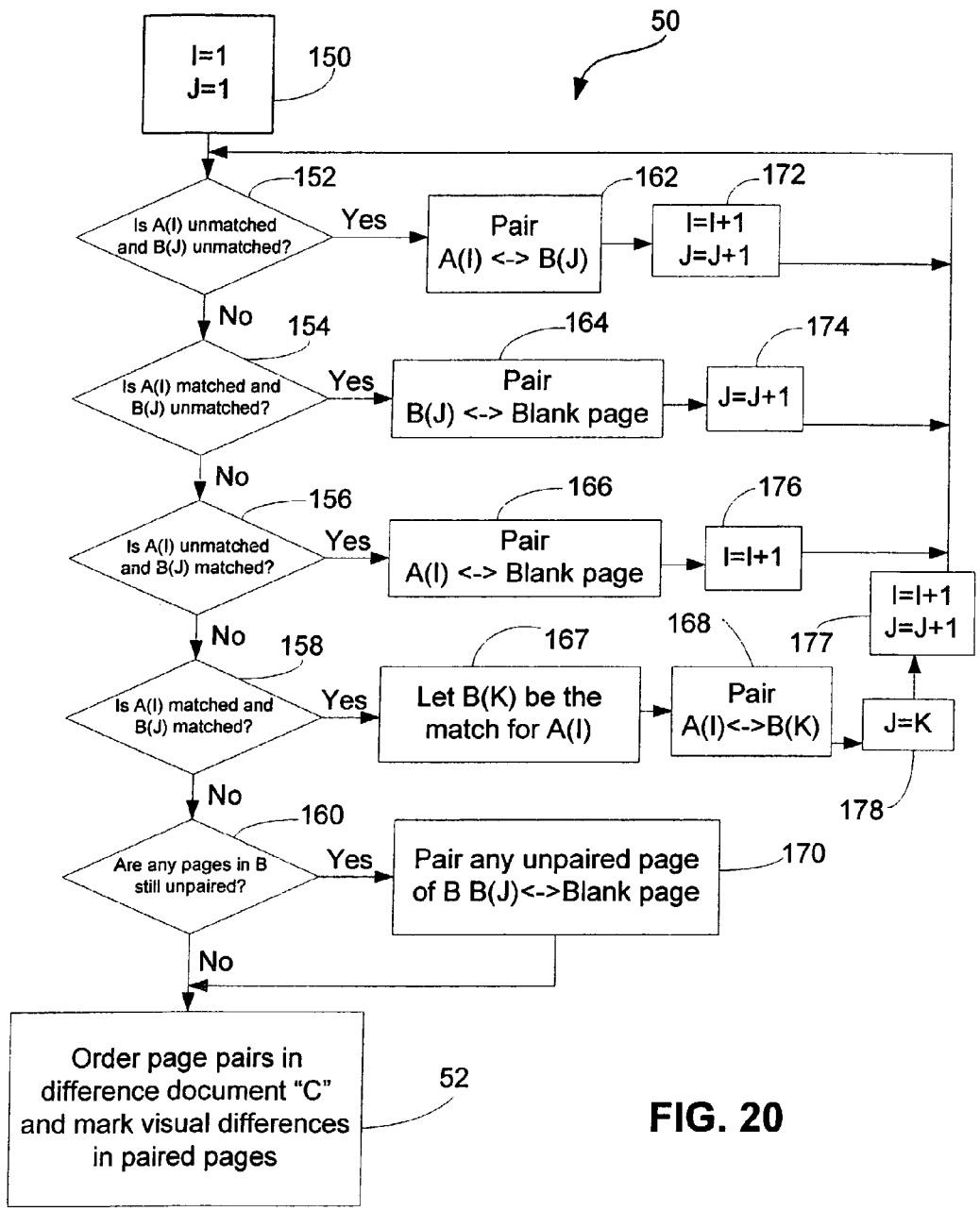

Referring now also to FIG. 20, the process 50 now pairs the remaining unpaired pages of document "A" in ascending order with either a still unpaired page of document "B" or with a blank page. Any remaining unpaired page of document "B" is also paired with a blank page. All pages of document "A" and of document "B" are now paired (FIG. 14). The paired pages 228 are arranged sequentially in difference document "C" (FIG. 15) and can be displayed side-by-side on display 18 (FIG. 8).

Process 50 (FIG. 20) visits the pages of document "A" in ascending order, starting 150 with the first page I=1 and the first page J=1 of document "B". If the page A(I) of document "A" is unpaired and the page B(J) of document "B" is also unpaired 152, then these pages are paired 162 although their respective digests do not match. FIG. 13 illustrates this situation with the pages A2X and B2X, respectively, and by the arrow 224 in FIG. 14. Although A2X and B2X do not match, they are paired under the assumption that it is rather unlikely that two unpaired pages (A2X, B2X) immediately follow two paired pages (A1, B1). At step 172 then increments I and J each by 1 and the next pages A(I+1) and B(J+1) are fetched.

Otherwise, step 154 checks if page A(I) is paired. Paired pages can be quickly found because they are tagged, as described above. If page A(I) is paired and page B(J) is not paired, corresponding to the pages AS and BB of FIG. 13, then B(J) is paired 164 with a blank page inserted into document "A" (arrow 226 in FIG. 14) and step 174 increments J by 1. The process then goes to 152, fetching the next pages.

Otherwise, step 156 next checks if page B(J) is paired. If page B(J) is paired and page A(I) is not paired, corresponding to the pages AA and B5 of FIG. 13, then A(I) is paired 166 with a blank page inserted into document "B" (arrow 226 in FIG. 14) and step 176 increments I by 1. The process then goes to 152, fetching the next pages.

Otherwise, step 158 next checks if page A(I) and page B(J) are each matched. For example, A(I) can be matched 167 with B(K), which FIG. 13 shows in the form of pages A7 and B8. A(I) is then paired 168 with the respective B(K). The counter for J then resets 178 J=K to account for the changed page order in document "B", as indicated by the crossed arrows 222 in FIG. 14. Step 177 then increments both I and J by 1 and the next pages are fetched at 152.

Otherwise, step 160 checks if any unpaired pages remain in document "B". Any unpaired pages in document "B" are then paired with blank pages inserted into document "A" 170.

All pages of both documents are now paired. The process 50 goes to 52 to sequentially arrange the page pairs in the difference document "C", as shown in FIG. 15, and to mark the visual differences in the paired pages 230 (FIG. 15). If the difference document "C" is formed of all paired pages that have identical marking operators (32 in FIG. 3), then difference document "C" has at least as many pages as document "A" and document "B" combined, taking into account page insertions and deletions. Difference document "C" retains the original page sequence (except for the insertion of blank pages) of one of the two source documents "A" and "B".

Figure 18:
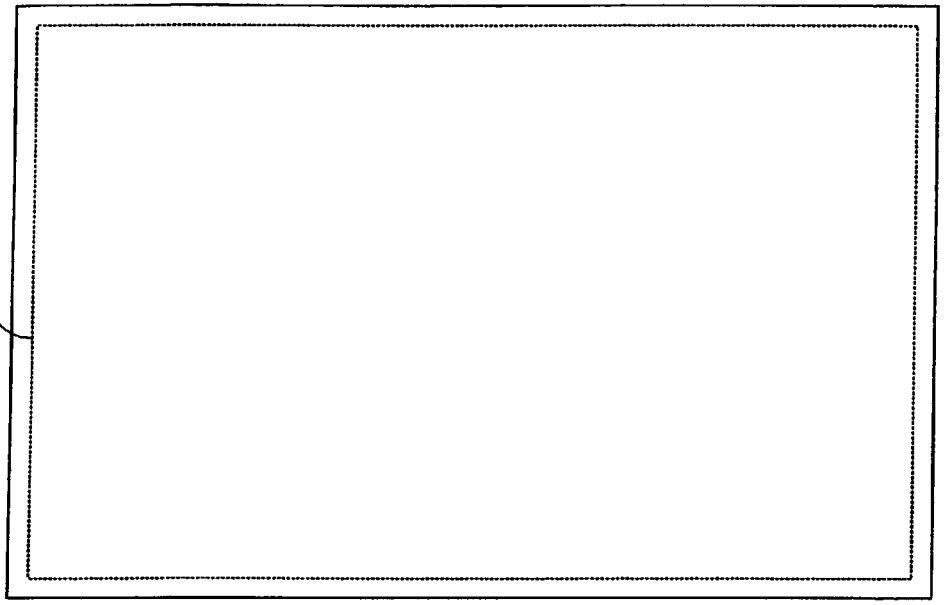
Figure 19:
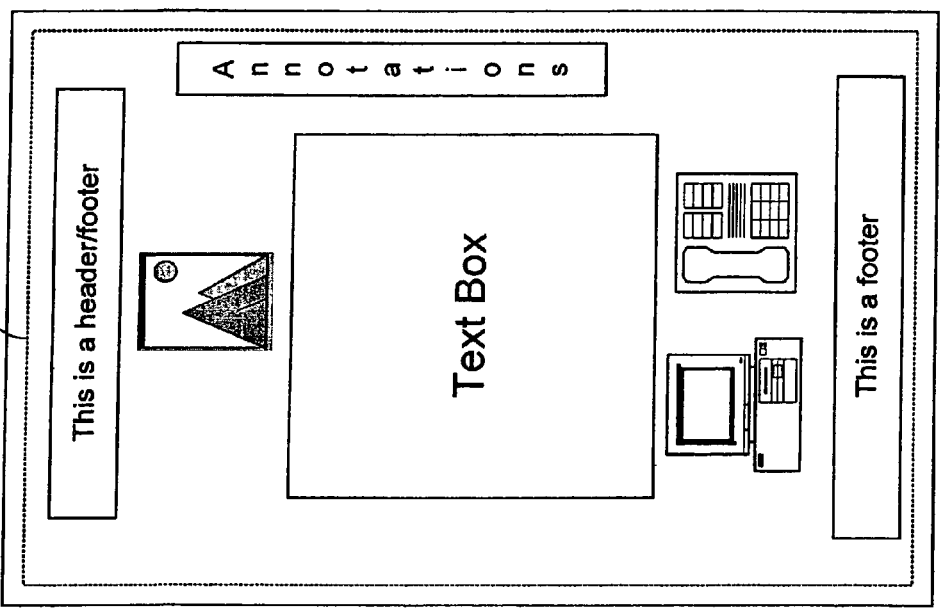

Alternatively, a difference document "C'" is formed of only those page pairs that are different according to the criteria applied in processes 38 and 42 of FIG. 3. Typically, difference document "C'" contains a significantly smaller number of pages than difference document "C". This is also indicated in FIG. 19. For example, if a 200-page document pair "A" and "B" has only three pages that are visually different, the difference document "C'" would only contain six pages. The paired pages of difference document "C" which are not identical, i.e., pages which differ in their marking operators, are marked with visible markings to alert the viewer. The following situations can occur:

Page pairs have identical marking operators and are not marked. The marking operator digests of page pairs are different, but the rendered bitmaps are identical. The pages are then not exactly identical but are still visually identical. A single box is then drawn around the entire page. A single box is also drawn around the entire page where that page is paired with a blank page. This is shown in FIGS. 18 and 19 as box 218.

Page pairs differ with respect to the rendered bitmap of the entire page but match when the bitmaps are compared for a smaller page area. A difference bitmap is produced (by an XOR operation) of the entire page area of the page pair. A marker process then scans the difference bitmap for non-zero values and calculates an outline of a suitable geometrical shape, such as a rectangle or a hexagon that surrounds clusters of the non-zero values. The outline around a single difference pixel is expanded until only identical pixels are found within a predetermined margin. Additional hexagons are started around other difference pixels. If too many hexagons are produced on a page, then the margin is increased to a larger value to limit the number of hexagons.

Figure 17:
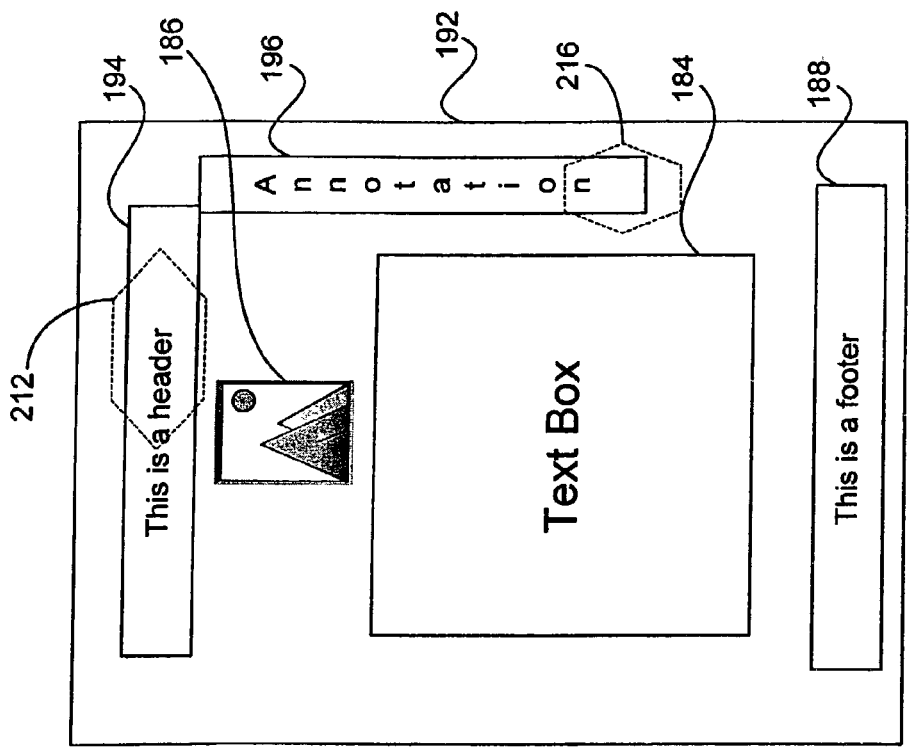
FIGS. 16 through 19 are block diagrams showing examples of markings applied to paired pages.
Figure 16:
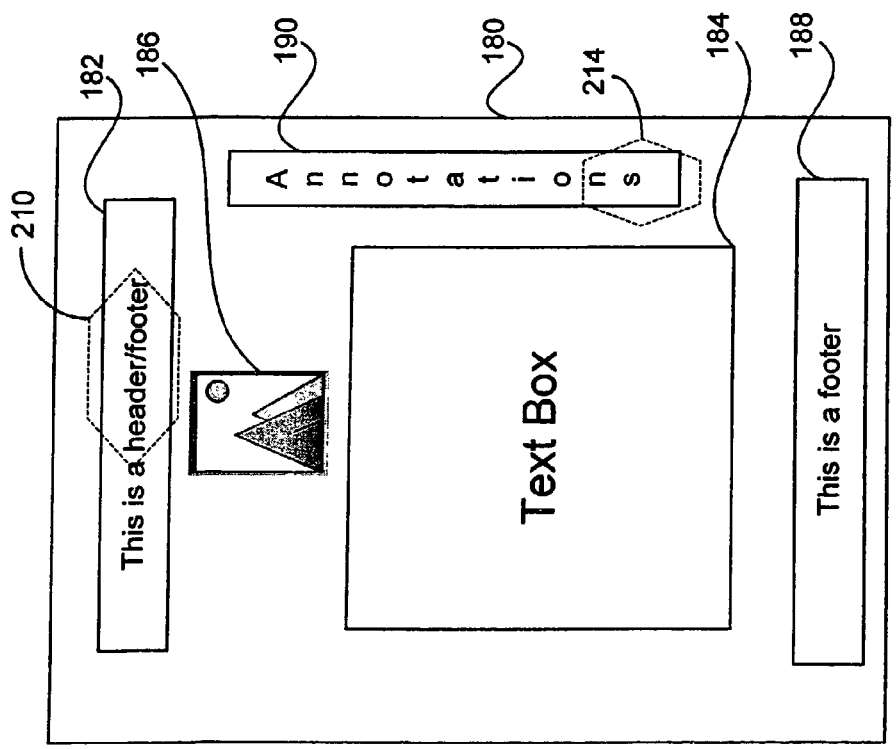

FIGS. 16 and 17 show the pages 180 and 192, respectively, after the printable differences are marked 52. As mentioned above, FIGS. 4 and 5 differ only with respect to the respective headers 182, 194 and annotations 190, 196. A hexagon 210 is drawn around the different text in header 182 of page 180, and a corresponding hexagon 212 is drawn around the different text in header 194 of page 192. Likewise, hexagons 214, 216 are drawn around the different text in annotations 190, 196, respectively. If another difference is detected, then another outline is produced around another difference pixel (not shown). If too many outlines are produced on a page, then the margin is increased to a larger value to limit the number of outlines so as to produce clearly discernible markings. The hexagons are preferably rendered in a contrasting color so as to stand out easily on the screen as well as on black-and-white printed pages.

After all pages are paired and the differences between paired pages are marked 52, the comparison is complete and the process terminates 53 (FIG. 3).

The process for comparing and matching two documents has been described for PDF files. The process, however, can also be used with other documents based on a page description language, such as PostScript.RTM (Adobe Systems Inc.), HTML, SQML, and XML, which includes objects other than simply lines of text as well as plain text documents or plain text documents having embedded graphical contents.

The change detection tool can be implemented in digital electronic circuitry, or in computer hardware, firmware, software, or in combinations of them. Apparatus of the change detection tool can be implemented in a computer program product tangibly embodied in a machine-readable storage device for execution by a programmable processor, and method steps of the change detection tool can be performed by a programmable processor executing a program of instructions to perform functions of the change detection tool by operating on input data and generating output.

The change detection tool can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

An example of one such type of computer is shown in FIG. 8, which shows a block diagram of a programmable processing system 10 suitable for implementing or performing the apparatus or methods of the invention. The system 10 includes a processor 12, a random access memory (RAM) 13, a program memory 14 (for example, a writable read-only memory (ROM) such as a flash ROM), a hard drive controller 17, and an input/output (I/O) controller 15 coupled by a processor (CPU) bus 16. The system 10 can be preprogrammed, in ROM, for example, or it can be programmed (and reprogrammed) by loading a program from another source (for example, from a floppy disk, a CD-ROM, or another computer).

The hard drive controller 17 is coupled to a hard disk 22 suitable for storing executable computer programs 24, including programs embodying the present invention, and data files, including the documents to be compared.

Also coupled to the I/O bus 19 is a display 18, a keyboard 20, and a printer 21. Alternatively, separate connections and/or separate buses can be used for the I/O interface 15, display 18 and keyboard 20.

As noted above, the present invention provides records, which can be of great importance to Web publishers when disputes relating to published content arise. For example, in disputes involving pricing of an item listed for sale on a Web publication, the records generated by the present invention can provide historical proof of what price was published and when it was published. In this way, such disputes can be resolved quickly and conclusively without the necessity for reconstruction of the chronology of the various versions of the subject Web page.

Thus, having fully described the present invention by way of example with reference to the attached drawing figures, it will be readily appreciated that many changes and modifications may be made to the invention and to any of the illustrative embodiments shown and/or described herein without departing from the spirit or scope of the invention as defined in the appended claims.

What is claimed is:

1. A method of tracking a Web publication, the method comprising:
    receiving a first version of a Web publication from the web publisher before the Web publication is published;
    storing a snapshot of the first version of the Web publication, the snapshot comprising information regarding a date and a time at which the first version was published;
    monitoring the Web publication for changes, each version of the Web publication comprising changes relative to the first version comprising a second or subsequent version of the Web publication;
    detecting a change in the Web publication;
    storing a snapshot of each one of the second or subsequent version of the Web publication only when a change is detected, the snapshot of the second or subsequent version including information regarding a date and a time at which the second or subsequent version was published; and
    generating a record of publication dates of a plurality of versions of the Web publication.

2. The method according to claim 1, wherein the method is implemented by a third party in a gatekeeping capacity.

3. The method according to claim 1, wherein the method is implemented by a third party in a polling capacity.

4. The method according to claim 1, wherein the method is implemented by a publisher of the Web publication in a gatekeeping capacity.

5. The method according to claim 1, wherein the method is implemented by a publisher of the Web publication in a polling capacity.

6. The method according to claim 1, wherein the first version of the Web publication is an original version of the Web publication.

7. The method according to claim 1, wherein the first version of the Web publication is an existing version of the Web publication.

8. The method according to claim 1, wherein the step of monitoring the Web publication for changes comprises monitoring the Web publication for changes at least daily.

9. The method according to claim 1, wherein the step of monitoring the Web publication for changes comprises monitoring the Web publication for changes at least hourly.

10. The method according to claim 1, wherein the step of monitoring the Web publication for changes comprises monitoring the Web publication for changes at regular intervals.

11. The method according to claim 1, further comprising monitoring the Web publication to determine whether the Web publication remains online.

12. The method according to claim 11, wherein the method terminates if it is determined that the Web publication does not remain online.

13. The method according to claim 11, wherein the method returns to the step of monitoring the Web publication for changes if it is determined that the Web publication remains online.

14. The method according to claim 1, wherein the snapshots comprise only displayed elements of the Web publication.

15. The method according to claim 1, wherein the snapshots comprise displayed and undisplayed elements of the Web publication.

16. The method according to claim 1, wherein the step of monitoring the Web publication for changes comprises monitoring only for changes to displayed elements of the Web publication.

17. The method according to claim 1, wherein the step of monitoring the Web publication for changes comprises monitoring for changes to displayed and undisplayed elements of the Web publication.

18. A computer program product, embodied on a computer-readable medium, programmed to implement a method comprising:
    receiving a firs version of a Web publication from the web publisher before the Web publication is published;
    storing a snapshot of the first version of the Web publication, containing at least one page, the snapshot comprising information regarding a date and a time at which the first version was made available;
    monitoring the Web publication for change, each version of the Web publication comprising changes relative to the first version comprising a second or subsequent version of the Web publication, containing at least one page;
    detecting a change in the Web publication at the same time and date that the second or subsequent version is published; and
    storing a snapshot of each one of the second or subsequent version of the Web publication only when a change is detected, the snapshot of the second or subsequent version including information regarding a date and a time at which the second or subsequent version was made available.

19. The method of claim 18, where monitoring the Web publication for changes comprises:
    computing a digest of each of the at least one pages of the first version of the Web publication;

computing a digest of each of the at least one pages of the second or subsequent version of the Web publication; and comparing the digest of each of the at least one pages of the first version of the Web publication with the digest of each of the at least one pages of the second or subsequent version of the Web publication on a non-visual page-by-page basis to determine if any of the digests are identical.

20. The method of claim 19, further comprising, pairing the identical digest of each of the at least one pages of the first version of the Web publication with the identical digest of each of the at least one pages of the second or subsequent version of the Web publication; and comparing any unpaired pages of the first version of the Web publication with any unpaired pages of the second or subsequent version of the Web publication using a different criterion.

21. The method of claim 20, further comprising, pairing any unpaired pages of the first version of the Web publication with any unpaired pages of the second or subsequent version of the Web publication found identical with the different criterion; and marking the unpaired pages of the second or subsequent version of the Web publication.

22. The method of claim 19, where computing a digest comprises generating a hash table.

23. A computer readable medium comprising a computer program including:

receiving a first version of a Web publication from the web publisher before the Web publication is published;

storing a snapshot of a first version of a Web publication, containing at least one page, the snapshot comprising information regarding a time at which the first version was placed online;

monitoring the Web publication for changes, each version of the Web publication comprising changes relative to the first version comprising a second or subsequent version of the Web publication, containing at least one page;

detecting a change in the Web publication; and storing a snapshot of each one of the second or subsequent version of the Web publication only when a change is detected, the snapshot of the second or subsequent version including information regarding a date and a time at which the second or subsequent version was placed online.

24. The method of claim 23, where monitoring the Web publication for changes comprises:

computing a digest of each of the at least one pages of the first version of the Web publication;

computing a digest of each of the at least one pages of the second or subsequent version of the Web publication; and comparing the digest of each of the at least one pages of the first version of the Web publication with the digest of each of the at least one pages of the second or subsequent version of the Web publication on a non-visual page-by-page basis to determine if any of the digests are identical.

25. The method of claim 24, further comprising, pairing the identical digest of each of the at least one pages of the first version of the Web publication with the identical digest of each of the at least one pages of the second or subsequent version of the Web publication; and comparing any unpaired pages of the first version of the Web publication with any unpaired pages of the second or subsequent version of the Web publication using a different criterion.

26. The method of claim 25, further comprising, pairing any unpaired pages of the first version of the Web publication with any unpaired pages of the second or subsequent version of the Web publication found identical with the different criterion; and marking the unpaired pages of the second or subsequent version of the Web publication.

27. The method of claim 24, where computing a digest comprises generating a hash table.

28. A computer system, including a processor, the computer system implementing a method comprising:

receiving a first version of a Web publication from the web publisher before the Web publication is published;

storing a snapshot of the first version of the Web publication, containing at least one page, the snapshot comprising information regarding a date and a time at which the first version was published online;

monitoring the Web publication for change, each version of the Web publication comprising changes relative to the first version comprising one of a second or subsequent version of the Web publication, containing at least one page;

detecting a change in the Web publication; and storing a snapshot of each of the second or subsequent version of the Web publication only when a change is detected, the snapshot of each of the second and subsequent version including information regarding a date and a time at which the second or subsequent version was published online.

29. The method of claim 28, where monitoring the Web publication for changes comprises:

computing a digest of each of the at least one pages of the first version of the Web publication;

computing a digest of each of the at least one pages of the second or subsequent version of the Web publication; and comparing the digest of each of the at least one pages of the first version of the Web publication with the digest of each of the at least one pages of the second or subsequent version of the Web publication on a non-visual page-by-page basis to determine if any of the digests are identical.

30. The method of claim 29, further comprising, pairing the identical digest of each of the at least one pages of the first version of the Web publication with the identical digest of each of the at least one pages of the second or subsequent version of the Web publication; and comparing any unpaired pages of the first version of the Web publication with any unpaired pages of the second or subsequent version of the Web publication using a different criterion.

31. The method of claim 30, further comprising, pairing any unpaired pages of the first version of the Web publication with any unpaired pages of the second or subsequent version of the Web publication found identical with the different criterion; and marking the unpaired pages of the second or subsequent version of the Web publication.

32. The method of claim 29, where computing a digest comprises generating a hash table.

* * * * *

UNITED STATES PATENT AND TRADEMARK OFFICE
CERTIFICATE OF CORRECTION

PATENT NO.         : 7,418,661 B2                                    Page 1 of 1
APPLICATION NO. : 10/246503
DATED              : August 26, 2008
INVENTOR(S)        : Sarah M. Brandenberger It is certified that error appears in the above-identified patent and that said Letters Patent is hereby corrected as shown below:

On Drawing sheet 11 of 14, in Fig. 14, line 1, above tag "222" insert -- Insert blank pages --.

In column 5, line 45, delete "20,020,013,825," and insert -- 20020013825, --, therefor.

In column 6, line 4, delete "20,010,016,873," and insert -- 20010016873, --, therefor.

In column 18, line 45, in Claim 18, delete "firs" and insert -- first --, therefor.

In column 18, line 51, in Claim 18, delete "change," and insert -- changes, --, therefor.

In column 20, line 22, in Claim 28, delete "change," and insert -- changes, --, therefor.

Signed and Sealed this

Seventeenth Day of February, 2009

JOHN DOLL
*Acting Director of the United States Patent and Trademark Office*